United States Patent
Wernersson et al.

(10) Patent No.: US 11,218,210 B2
(45) Date of Patent: Jan. 4, 2022

(54) TECHNIQUE FOR CHANNEL STATE ACQUISITION

(71) Applicant: Telefonaktiebolaget LM Ericsson (publ), Stockholm (SE)

(72) Inventors: Niklas Wernersson, Kungsängen (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 16/616,520

(22) PCT Filed: May 30, 2017

(86) PCT No.: PCT/EP2017/063069
§ 371 (c)(1),
(2) Date: Nov. 25, 2019

(87) PCT Pub. No.: WO2018/219438
PCT Pub. Date: Dec. 6, 2018

(65) Prior Publication Data
US 2020/0358509 A1    Nov. 12, 2020

(51) Int. Cl.
*H04B 7/06* (2006.01)
*H04B 7/0408* (2017.01)
(Continued)

(52) U.S. Cl.
CPC ......... *H04B 7/0632* (2013.01); *H04B 7/0408* (2013.01); *H04B 7/0486* (2013.01); *H04B 7/0617* (2013.01); *H04L 5/0051* (2013.01)

(58) Field of Classification Search
None
See application file for complete search history.

(56) References Cited

U.S. PATENT DOCUMENTS

| 2014/0098689 A1* | 4/2014 | Lee ..................... H04B 7/0469 370/252 |
| 2014/0177745 A1* | 6/2014 | Krishnamurthy .... H04B 7/0413 375/267 |

(Continued)

FOREIGN PATENT DOCUMENTS

| EP | 2439978 A1 * | 4/2012 | ....... H04L 25/03343 |
| EP | 2439978 A1 | 4/2012 | |

OTHER PUBLICATIONS

3rd Generation Partnership Project, "3rd Generation Partnership Project; Technical Specification Group Radio Access Network; Evolved Universal Terrestrial Radio Access (E-UTRA); Physical Layer Procedures (Release 10)", Technical Specification, 3GPP TS 36.213 V10.13.0, Jun. 1, 2015, pp. 1-128, 3GPP.

(Continued)

*Primary Examiner* — Adnan Baig
(74) *Attorney, Agent, or Firm* — Coats & Bennett, PLLC

(57) ABSTRACT

A technique for transmitting reference signals (RS), from a first station using a transmit antenna (400) with a number of antenna ports to a second station for determining channel state information (CSI), of a radio channel between the first station and the second station is described. As to a method aspect of the technique, a first set of precoders (502) is defined for the number of antenna ports. Based on the first set, a second set of precoders (702) is derived for the number of antenna ports. A second rank of the second set of precoders (502) is different from a first rank of the first set of precoders (702). The second rank of the second set is less than the number of antenna ports (402). Each of the antenna ports is associated with non-zero energy by at least one of the precoders (702) of the second set. The RS are transmitted using each of the precoders (702) of the second set.

17 Claims, 10 Drawing Sheets

(51) Int. Cl.
  *H04B 7/0456* (2017.01)
  *H04L 5/00* (2006.01)

(56) References Cited

U.S. PATENT DOCUMENTS

2014/0198868 A1     7/2014  Yang et al.
2015/0358062 A1*   12/2015  Skillermark .......... H04L 1/0026
                                                        370/329
2018/0316405 A1*   11/2018  Li ........................ H04B 7/0626
2019/0349103 A1*   11/2019  Wang .................. H04B 17/345

OTHER PUBLICATIONS

3rd Generation Partnership Project, "3rd Generation Partnership Project; Technical Specification Group Radio Access Network; Evolved Universal Terrestrial Radio Access (E-UTRA); Physical Layer Procedures (Release 13)", Technical Specification, 3GPP TS 36.213 V13.5.0, Mar. 1, 2017, pp. 1-386, 3GPP.
Ji, H. et al., "Overview of Full Dimension MIMO in LTE-Advanced Pro", IEEE Communication Magazine, vol. 55 No. 2, Feb. 1, 2017, pp. 176-184, IEEE.

* cited by examiner

100

200

TECHNIQUE FOR CHANNEL STATE ACQUISITION

TECHNICAL FIELD

The present disclosure relates to a technique for transmitting reference signals. More specifically, and without limitation, a method and a device for transmitting reference signals from a first station using a transmit antenna with a number of antenna ports to a second station for determining channel state information of a radio channel between the first station and the second station are provided.

BACKGROUND

A wireless communication system with multi-antenna technique uses, for transmission and/or reception, an antenna with a plurality of antenna elements. Such a multi-antenna technique can significantly increase data rates and reliability of the wireless communication system. The antenna is accessed through a number of antenna ports, which may be identical to the antenna elements or mapped to the antenna elements.

The performance of the wireless communication system is in particular improved if both a transmitting station and a receiving station are equipped with multiple antenna ports, which results in a multiple-input multiple-output (MIMO) radio channel. Such systems and related techniques are generically referred to as MIMO. Beamforming is a particular application of MIMO, e.g., on a multiple-input single-output (MISO) channel, wherein different complex-valued combinations of the multiple antenna ports generate different beams with defined directions. Herein, MIMO is used as an umbrella term also encompassing beamforming and MISO.

As the number of antenna ports increases, the channel state information (CSI) for the MIMO channel has to be measured in more and more detail. In a straightforward implementation, the number of reference signals (RS) transmitted by the transmitting station and measured by the receiving station increases linearly with the number of antenna ports at the transmitting station. Hyoungju Ji et al. discuss the scaling relation with reference to Table I in the document "Overview of Full-Dimension MIMO in LTE-Advanced Pro", IEEE Communications Magazine, Volume 55, Issue 2.

Hence, the increase in radio resources occupied for transmitting the RS counteracts the gain in channel capacity by spatial multiplexing. Beam sweeping is an example scheme for transmitting RS. When performing beam sweeping using antennas with a large number of antenna ports, a large number of beams needs to be transmitted in order to measure the entire radio channel. This is expensive in terms of time and radio resource. Each beam adds to the overhead. Hence, for a large number of transmit antenna ports, the RS transmission becomes expensive in terms of overhead.

SUMMARY

Accordingly, there is a need for a technique that transmits reference signals at a lower cost in terms of overhead. Alternatively or in addition, there is a need for a technique that efficiently transmits reference signals for determining the channel state of a radio channel including a plurality of transmit antenna elements.

As to one aspect, a method of transmitting reference signals (RS) from a first station using a transmit antenna with a number of antenna ports to a second station for determining channel state information (CSI) of a radio channel between the first station and the second station is provided. The method comprises or triggers a step of defining a first set of precoders for the number of antenna ports. The method further comprises or triggers a step of deriving, based on the first set, a second set of precoders for the number of antenna ports. A second rank of the second set of precoders is different from a first rank of the first set of precoders. The second rank of the second set is less than the number of antenna ports. Each of the antenna ports is associated with non-zero energy by at least one of the precoders of the second set. The method further comprises or triggers a step of transmitting the RS using each of the precoders of the second set.

By using a number of precoders in the second set, e.g., equal to the second rank of the second set of precoders, which is less than the number of antenna ports, the amount of overhead for transmitting the RS can be reduced, e.g., compared to performing a conventional beam sweep and/or scanning the radio channel, e.g., using the first set of precoders.

The first and second ranks may be equal to the number of precoders in the first and second sets, respectively. Alternatively or in combination, the first rank may be equal to the number of antenna ports. The first set of precoders may be configured for a beam sweep. Alternatively or in combination, the second rank may be less than the first rank.

The abbreviation "RS" is used herein for both singular ("reference signal") and plural ("reference signals"). If not stated otherwise, "RS" may encompass the plural, e.g., different reference signals that are transmitted on different radio resources (e.g., in the time domain and/or the frequency domain) and/or using different (e.g., orthogonal) coding. More specifically, orthogonally-coded RS may be transmitted simultaneously and/or on the same subcarriers.

The CSI may be determined based on the transmitted RS, e.g., at the second station. The RS may be referred to as CSI-RS. The set of transmitted RS may constitute a set of CSI-RS. The second station may use the determined CSI for a transmission (e.g., data transmission) from the second station to the first station, e.g., based on channel reciprocity, e.g. in a Time Division Duplex (TDD) mode. Alternatively or in addition, the first station may receive the CSI from the second station (CSI feedback). The second station may report the determined CSI to the first station, e.g., in a Frequency Division Duplex (FDD) mode. Using the precoders for RS or data transmission may also be referred to as beamforming.

The first station and/or the second station may use the determined CSI for precoding, e.g. for precoding a data transmission or a further RS transmission. The reported CSI may be indicative of a precoder, e.g., a Precoding Matrix Indicator (PMI) referring to a precoder codebook. The precoder codebook may be specified by a technical standard and/or stored at both the first station and the second station.

Transmitting RS by the first station, which enable the second station to measure the channel state of the radio channel, may also be referred to as scanning, evaluating or observing the radio channel.

The number of antenna ports of the transmit antenna may define the input of the radio channel. The radio channel between the first station and the second station may be a multiple-input multiple-output (MIMO) radio channel (e.g., if the second station comprises a receive antenna with a number of antenna elements) or a multiple-input single-output (MISO) radio channel (e.g., if the second station comprises a receive antenna with one antenna port or a fixed combination of antenna ports). Alternatively or in addition, the RS may be transmitted to a plurality of second stations. Each of the second stations may comprise a receive antenna with one or more antenna ports. The radio channel between the first station and the plurality of second stations may also be referred to as a MIMO radio channel from the perspective of the first station.

The precoders may comprise or be linear precoders. The first rank and the second rank may be the number of linearly independent precoders in the first set and the second set, respectively.

Each of the precoders (of the first and/or second set) may define, or may be represented by, complex-valued weighting factors for the antenna ports of the transmit antenna. Applying any one of the precoders (of the first and/or second set) may be implemented by setting the complex-valued weighting factors for the antenna ports according to the applied precoder.

Each of the precoders in the second set may be a linear combination of precoders of the first set.

The precoders (of the first and/or second set) may be coupled to the radio channel as a complex vector space (more specifically, to the input of the radio channel as a complex vector space). Said complex vector space may be referred to as channel space.

The channel space may be the complex vector space spanned by the antenna ports of the transmit antenna. A dimension of the channel space may correspond to the number of antenna ports. Each precoder of the first and/or second set may correspond to a vector (i.e., an element) of the channel space.

The channel space may be the vector space of complex-valued weighting factors for the antenna ports, e.g., one weighting factor may be assigned to each of the antenna ports. Each of the precoders (of the first set and/or the second set) may be a vector of the channel space. A gain of any one of the antenna ports may correspond to the absolute value of the weighting factor assigned to the corresponding one of the antenna ports. A phase shift of any one of the antenna ports may correspond to the phase of the weighting factor assigned to the corresponding one of the antenna ports.

The first set of precoders may span a first subspace of the channel space (e.g., the entire channel space). That is, the first subspace may comprise linear combinations of the precoders of the first set. The first rank may be the dimension of the first subspace. Alternatively or in addition, the second set of precoders may span a second subspace of the channel space. That is, the second subspace may comprise linear combinations of the precoders of the second set. The second rank may be the dimension of the second subspace. Since the second rank is less than the number of antenna ports, the dimension of the second subspace may be less than the dimension of the channel space, i.e., the second subspace may be a proper subspace of the channel space.

Alternatively or in addition, each of the first set of precoders and the second set of precoders may cover an angular range. Herein, "angular" and "directional" may be synonymous. Angles of the angular range may be defined between directions (also: rays or lines of sight) of the transmit antenna. For defining an angle, the vertex of the angle may be at the transmit antenna. "Angular" and "directional" may refer to the direction of a gain of the transmit antenna, e.g., the direction of a directional gain when a certain precoder is applied. Alternatively or in addition, "angular" and "directional" may refer to the direction of the radio transmission, e.g., the direction of a directional energy flux density (e.g., the Poynting vector [named after John Henry Poynting]) of the radiation caused by the corresponding precoder.

The angular range covered by the second set of precoders may be equal to or may comprise the angular range covered by the first set of precoders. The first set of precoders and the second set of precoders may cover the same angular range.

Each of the first set of precoders and the second set of precoders may cover the angular range with an angular resolution. Different directions within the angular range may have different angular resolutions. Alternatively or in addition, the first set of precoders may cover the angular range with a first angular resolution, which is different from a second angular resolution of the second set of precoders.

Each of the precoders of the first set and/or the second set may correspond to a radiation pattern. The radiation pattern may comprise a radiation characteristic, i.e., a directional gain or directional energy flux density. The first set of precoders and/or the second set of precoders may correspond to a first set of radiation patterns and a second set of radiation patterns, respectively. The first set of radiation patterns and the second set of radiation patterns may be different.

Each of the precoders of the first set and/or the second set may define or correspond to at least one of a direction and a width. The direction may be a maximum (e.g., on a circle or a sphere centered at the transmit antenna with a diameter corresponding to the electromagnetic far field) of the directional gain or the directional energy flux density of the radiation pattern. The maximum may be a global maximum (which is also referred to as a main lobe). The width may be the angle between points (e.g., of the main lobe) of a certain power level (e.g., half-power, i.e., −3 dB) relative to the maximum (e.g., on the circle or the sphere centered at the transmit antenna).

Deriving the second set may include increasing the width associated with a precoder of the second set compared to the width associated with precoders of the first set. The width associated with the precoder of the second set may be increased by linearly combining those precoders of the first set, which are associated with different (e.g., neighboring) directions. This derivation of a precoder for the second set from at least two precoders of the first set may be an example for the beam merging.

Alternatively or in addition, deriving the second set may include decreasing the width associated with a precoder of the second set compared to the width associated with a precoder of the first set. The width associated with a precoder of the second set may be decreased by replicating an output of the precoder of the first set at shifted antenna ports. The shifted antenna ports may be associated with laterally offset antenna elements. The precoder of the second set derived based on the precoder of the first set may be configured to replicate the output of the precoder of the first set at distinct groups of the antenna ports. Alternatively or in addition, the derived precoder of the second set may replicate the output of the precoder of the first set by superimposing the output at overlapping groups of the antenna ports.

Each of the precoders of the first set and/or the second set may correspond to one or more beams. The precoder may correspond to two or more beams, e.g., if the radiation pattern includes multiple lobes or fingers.

A beam may be an example of a radiation pattern. The beam may be a lobe (e.g. a local directional maximum of the gain) or the main lobe of the radiation pattern (e.g., if there are no side lobes or if all side lobes are small compared to the main lobe). The first set of precoders and/or the second set of precoders may correspond to a first set of beams and a second set of beams, respectively. At least one of the direction and the width may be defined for each of the beams.

The first set of beams and the second set of beams may be different. Deriving the second set from the first set may include splitting a beam corresponding to a precoder of the first set into multiple beams each corresponding to a precoder of the second set. Alternatively or in addition, deriving the second set from the first set may include merging two or more beams each corresponding to a precoder of the first set into a beam corresponding to a precoder of the second set.

The angular resolution of the first or second set of precoders may correspond to (e.g., may be the inverse of) angles between the neighboring directions (e.g., directions of neighboring beams). Alternatively or in addition, the angular resolution of the first or second set of precoders may correspond to (e.g., the inverse of) the widths of the precoders (e.g., the corresponding beams).

At least one of direction and width may be defined for each of the precoders. Furthermore, at least one of the angular range and the angular resolution may be defined for each of the first and second sets of precoders.

The angular range (e.g., as covered by the first set of precoders and/or the second set of precoders) may be complete (also: "seamless"). Over the angular range, the widths of precoders corresponding to neighboring directions may cover the angle between the neighboring directions.

The angular range and/or the angular resolution may be one-dimensional or two-dimensional. For one dimension, the direction may correspond to a point on a horizontal circle (e.g., the circle centered at the transmit antenna) or to an azimuthal angle. An arc or a section of the horizontal circle or an interval of the azimuthal angle may represent the angular range. For two dimensions, the direction may correspond to a point on a sphere (e.g., the sphere centered at the transmit antenna) or a combination of azimuthal and polar angles. A solid angle (i.e., a region on the sphere) or a combination of an azimuthal angle interval and a polar angle interval may represent the angular range.

The angular range may be partitioned into a number of portions. The second set of precoders may cover different portions of the angular range with different granularities or different levels of granularity. Using such a second set for CSI-RS transmission may also be referred to as alternating beam granularity in CSI acquisition.

The different levels of granularity may be obtained by splitting coarser granularity channel subspaces into multiple subspaces. Alternatively or in addition, the different levels of granularity may be obtained by merging fine granularity channel subspaces into coarser subspaces. Alternatively or in addition, the different levels of granularity may be obtained by performing a numerical optimization.

Herein, the granularity may correspond to an angular resolution. The granularity for a given portion of the angular range may be the angular resolution of those precoders in the second set that cover the portion of the angular range. The angular resolution may be defined in terms of angles, e.g., the number of precoders in the second set that cover the portion divided by the angular range of the portion. Alternatively or in addition, the angular resolution of the second set may be defined relative to the first set, e.g., relative to the angular resolution of those precoders in the first set that cover the same portion of the angular range. For example, if a given portion of the angular range is covered by both x precoders of the first set and y precoders of the second set, the granularity for the portion may be y/x. The portion may (e.g., by definition of the portion) comprise one precoder of the first set (x=1). For example, the one precoder (or the corresponding beam) of the first set may be split into y precoders (or corresponding y beams) of the second set.

The granularity of a portion may be the minimum number of precoders of the second set for covering the portion divided by the minimum number of precoders of the first set for covering the portion, or divided by the minimum number of precoders of any complete basis of the channel space for covering the portion. The granularity may be greater than one for beam splitting and less than one for beam merging.

Alternatively or in addition, the different portions of the angular range may be covered by different (i.e., linearly independent, e.g., orthogonal) subspaces of the channel space. The different subspaces may have different granularities according to the second set of precoders.

The granularity of a given portion may be the codimension of the subspace within the second subspace for covering the portion relative to the subspace within the channel space for covering the portion.

The "covering" may be defined as follows. For example, a subspace with dimension y within the second subspace may be said to cover a given portion of the angular range, if for each direction in the portion there is a normalized linear combination $P=\Sigma_{j=1\ldots y} c_j p_j$ of the precoders in the subspace (i.e., there are coefficients $(c_1, \ldots, c_y)$ in $\mathbb{C}^y$ with $|c_1|^2 + \ldots + |c_y|^2 = 1$) so that the power of P in the direction is above a certain threshold, e.g., 3 dB of a peak power or gain (e.g., of a maximum of the directional power or gain). Alternatively, a subspace with dimension y within the second subspace may be said to cover a given portion of the angular range, if there is a normalized linear combination $P=\Sigma_{j=1\ldots y} c_j p_j$ of the precoders $p_j$ in the subspace (i.e., there are coefficients $(c_1, \ldots, c_y)$ in $\mathbb{C}^y$ with $|c_1|^2 + \ldots + |c_y|^2 = 1$) so that the power of P in the direction is above a certain threshold, e.g., −3 dB of a peak power or gain (e.g., of a maximum of the directional power or gain), for each direction in the portion.

The different portions of the angular range may be covered by different subspaces of the second subspace. The granularity of a given portion may be the dimension of the subspace, which covers the portion and is in the channel space, divided by the dimension of the subspace, which covers the portion and is in the second subspace.

The different subspaces of the second subspace for covering the respective portions of the angular range may be spanned by disjoint subsets of precoders of the second set. For example, the second set may be adapted to the portions so that each of the portions is uniquely associated with one of the disjoint subsets of precoders of the second set.

The second set of precoders may be derived from the first set of precoders by combining precoders of the first set, e.g., if the first set of precoders covers the entire channel space.

The granularity of a given portion may be the codimension of the subspace within the second subspace for covering the portion relative to the subspace within the first subspace for covering the portion, e.g., if the first set of precoders covers the entire channel space. For example, the different subspaces of the second subspace for covering the respective portions of the angular range may be spanned by disjoint subsets of precoders of the second set. The different subspaces of the first subspace for covering the respective portions of the angular range may be spanned by disjoint subsets of precoders of the first set. The granularity of a given portion may be the number (or rank) of the precoders in the corresponding subset of the second set divided by the number (or rank) of the precoders in the corresponding subset of the first set.

Disjoint subsets of the precoders of the second set may associate non-zero energy with different groups of the antenna ports.

A subset of the precoders of the second set may be derived from at least one of the precoders of the first set using a Kronecker product of a unitary matrix and the at least one of the precoders of the first set. This derivation of a subset of precoders for the second set from at least one precoder of the first set may be an example for the beam splitting. The width associated with each of the precoders resulting from the beam splitting may be less than the width of the precoder of the first set from which the subset is derived. For the derived subset of the precoders of the second set, the output of the Kronecker product may be mapped to a group of antenna ports that is associated with non-zero energy. For the derived subset of the precoders of the second set, all other ports may be associated with zero energy. The unitary matrix may include a discrete Fourier transform (DFT) matrix.

At least one of the first set of precoders and the second set of precoders may be orthogonal. Each precoder of the first set and/or the second set may be normalized.

At least one of the first set of precoders and the second set of precoders may be represented or representable by a precoder matrix. The first set and/or the second set may be orthogonal if all column vectors of the corresponding precoder matrix are mutually orthogonal. Each precoder may be represented or representable by a different column of the corresponding precoder matrix. Each precoder may be represented or representable by a number of (e.g., complex) precoding weights. Each precoding weight may be associated with one of the antenna ports. The number of columns of the precoder matrix may correspond to the number of precoders in the set. The number of rows of the precoder matrix may correspond to the number of antenna ports.

The first set may be not orthogonal and the second set may be orthogonal. The derivation of the second set may include performing a Gram-Schmidt orthonormalization, e.g., on the first set and/or resulting in the second set.

The method may further comprise or trigger a step of receiving a report indicative of the CSI from the second station. The second set may be derived depending on previously received CSI. Alternatively or in addition, the step of deriving may be repeated by deriving a third set of precoders based on the second set depending on the CSI received in response to transmitting the RS using the precoders of the second set.

The transmit antenna may include a plurality of antenna elements. Each antenna port may be associated with at least one antenna element of the transmit antenna. The transmit antenna may include a linear or two-dimensional array of the antenna elements, optionally each including sub-elements for different polarizations.

At least one of the first station and the second station may include a base station of a radio access network (RAN). Alternatively or in addition, at least one of the first station and the second station may include a radio device configured to access a RAN.

At least some or all of the method steps may be performed and/or triggered by the first station.

By deriving the second set from the first set, the granularity may be changed. The granularity may be reduced (e.g., for one or more portions or for the entire angular range) or increased (e.g., for one or more portions of the angular range). The granularity may be changed depending on at least one of the CSI, a deployment setup of the first station, a topographical environment of the first station, a status of radio connectivity (e.g., a number of second stations in a radio resource control connected mode with the first station) and a Quality of Service (QoS) requirement of the second station.

While the deriving step may change the granularity, the covered angular range may be maintained. The technique may be embodied to scan the first subspace, e.g., the entire channel space, or a subspace of the channel space, e.g., the second subspace. The entire channel space may be the vector space spanned by the number of antenna ports.

By transmitting the RS using the second set of precoders, the radio channel may be swept with radiation patterns (e.g., beams) corresponding to different levels of the granularity. Hence, some parts of the radio channel (e.g., subspaces of the channel space and/or portions of the angular range) may be swept with a fine granularity compared to other parts of the radio channel that are swept with beams providing a coarser granularity. Herein, the different "parts of the channel" may correspond to at least one of the different portions of the angular range, the different subsets of the second set of precoders for covering the different portions and the different subspaces of the second subspace for covering the different portions.

The technique may be applied for managing and/or acquiring the CSI in a wireless communication system. The RS may be transmitted using the second set such that the RS represent at least two different levels of granularity and jointly cover a given angular range. The second set of precoders used for transmitting the RS may comprise a number of precoders (e.g., the second rank) and/or correspond to a number a virtual ports, which is less than the required total number of ports (e.g., the number of antenna ports of the transmit antenna) for spanning the angular range (e.g., the entire angular range of the transmit antenna) with finest possible granularity.

Transmitting the RS using each of the precoders of the second set may include transmitting at least one RS per precoder of the second set. This set of transmitted RS may be transmitted utilizing a non-zero power on every antenna port.

Deriving the second set of precoders may comprise partitioning the angular range into M portions. Alternatively or equivalently, the first set of precoders may be partitioned into M subsets of precoders and/or the first subspace may be partitioned into M subspaces (i.e., the first subspace may be the direct sum of the M subspaces). Optionally, a dimension of each of the M subspaces and/or a number of precoders in each of the M subsets of the first set may be equal to K. The first subspace may correspond to the entire channel space. The number of antenna ports may be equal to $N=M \cdot K$.

The second set may be derived by linearly mapping at least one (e.g., the i-th) of the M subspaces to a (e.g., $q_i$-dimensional) subspace of the second subspace. Preferably, $q_i < K$ for at least one $i=1, \ldots, M$. The transmission of non-zero power may be obtained by virtualizing a $q_i$-dimensional signal (e.g., comprising the RS for the i-th subspace of the second subspace) to a K-dimensional signal.

The second subspace may be the direct sum of M subspaces, e.g., each being either identical to the corresponding one of the M subspace of the first subspace or being the image of the corresponding mapping. Alternatively or equivalently, the second set of precoders may be partitioned into K subsets, each comprising either the same precoders or $q_i$ linear combinations of the precoders of the corresponding one of the M subsets of the first set.

While terminology from 3GPP Long Term Evolution (LTE) is used in this disclosure to exemplify the technique, this should not be seen as limiting the scope of the technique to the particular systems or Radio Access Technologies (RATs). Other wireless systems or RATs, especially 5th Generation (5G) New Radio (NR), Wideband Code Division Multiple Access (WCDMA, e.g. in conjunction with Universal Mobile Telecommunications System, UMTS), Worldwide Interoperability for Microwave Access (WiMax) according to IEEE 802.16, Ultra Mobile Broadband (UMB) and Global System for Mobile Communications (GSM), can benefit from applying the technique.

Terminology such as base station, Node B (NB), evolved Node B (eNodeB or eNB) or gNode B (gNB) and radio device or user equipment (UE), is non-limiting. Particularly, such terminology does not imply a hierarchical relation between the first station and the second station. For example, the first station or the "eNodeB" may be implemented by any device 1, and the second station or "UE" may be implemented by any device 2. The first station and the second station may communicate with each other over some radio channel. Furthermore, while the description refers to a wireless transmissions in the downlink for clarity, the technique is also applicable in the uplink.

The radio device may be any device configured for accessing a RAN. The radio device may be a UE (e.g., a 3GPP UE), a mobile or portable station (e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine (ATM).

Alternatively or in addition, the base station may be any device providing radio access or node of a RAN. Examples for the base station may include a 3GPP base station (e.g., a 3G base station or NB, 4G base station or eNB, or a 5G base station or gNB), an access point or AP (e.g., a Wi-Fi AP) and a network controller (e.g., according to Bluetooth, ZigBee or Z-Wave).

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network (e.g., the RAN and/or on the radio channel) and/or via the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to another aspect, a device for transmitting reference signals (RS) from a first station using a transmit antenna with a number of antenna ports to a second station for determining channel state information (CSI) of a radio channel between the first station and the second station is provided. The device is configured to perform the method aspect. Alternatively or in addition, the device may comprise a defining unit configured to define a first set of precoders for the number of antenna ports. The device may further comprise a deriving unit configured to derive, based on the first set, a second set of precoders for the number of antenna ports. A second rank of the second set of precoders is different from a first rank of the first set of precoders. The second rank of the second set is less than the number of antenna ports. Each of the antenna ports is associated with non-zero energy by at least one of the precoders of the second set. The device may further comprise a transmitting unit configured to transmit the RS using each of the precoders of the second set.

As to a further device aspect, a device for transmitting reference signals (RS) from a first station using a transmit antenna with a number of antenna ports to a second station for determining channel state information (CSI) of a radio channel between the first station and the second station is provided. The device comprises at least one processor and a memory. Said memory comprises instructions executable by said at least one processor whereby the device is operative to define a first set of precoders for the number of antenna ports. The device is further operative to derive, based on the first set, a second set of precoders for the number of antenna ports. A second rank of the second set of precoders is different from a first rank of the first set of precoders. The second rank of the second set is less than the number of antenna ports. Each of the antenna ports is associated with non-zero energy by at least one of the precoders of the second set. The device is further operative to transmit the RS using each of the precoders of the second set.

As to a further aspect, a device for transmitting reference signals (RS) from a first station using a transmit antenna with a number of antenna ports to a second station for determining channel state information (CSI) of a radio channel between the first station and the second station is provided. The device may comprise one or more modules for performing the method aspect. Alternatively or in addition, the device comprises a definition module for defining a first set of precoders for the number of antenna ports. The device further comprises a derivation module for deriving, based on the first set, a second set of precoders for the number of antenna ports. A second rank of the second set of precoders is different from a first rank of the first set of precoders. The second rank of the second set is less than the number of antenna ports. Each of the antenna ports is associated with non-zero energy by at least one of the precoders of the second set. The device further comprises a transmission module for transmitting the RS using each of the precoders of the second set.

The devices may further include any feature disclosed herein in the context of the method aspect. Particularly, any one of the units and modules, or a dedicated unit or module, may be configured to perform or trigger one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Third Generation Partnership Project (3GPP) Long Term Evolution (LTE) implementation, it is readily apparent that the technique described herein may also be implemented in any other radio network, including a successor of LTE (e.g. LTE-Advanced, LTE-A, or LTE with License-Assisted Access, LTE-LAA), 5G New Radio (NR), Wireless Local Area Network (WLAN) according to the standard family IEEE 802.11, Bluetooth according to the Bluetooth Special Interest Group (SIG) and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
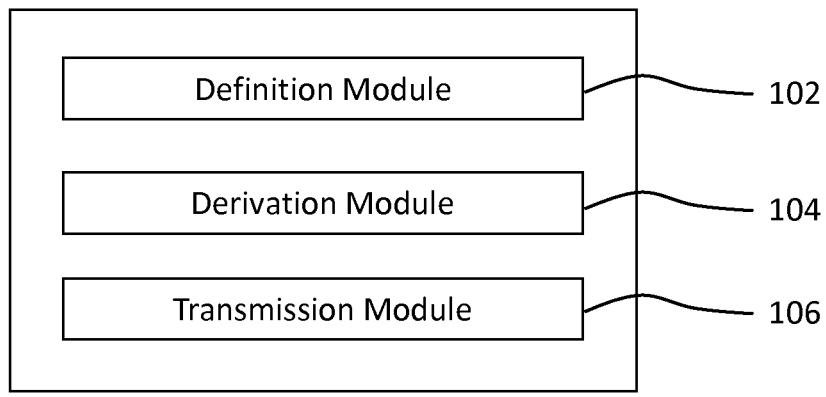
FIG. 1 shows a schematic block diagram for an embodiment of a device for transmitting reference signals using a transmit antenna with a number of antenna ports.

FIG. 1 schematically illustrates a block diagram for an embodiment of a device, which is generically referred to by reference sign 100, for transmitting reference signals (RS) from a first station using a transmit antenna with a number of antenna ports to a second station for determining channel state information (CSI) of a radio channel between the first station and the second station. The device 100 may be implemented at the first station or at a node controlling the first station.

The device 100 comprises a definition module 102 that defines a first set of precoders for the number of antenna ports of the first station. The device 100 further comprises a derivation module 104 that derives, based on the first set, a second set of precoders for the number of antenna ports. A second rank of the second set of precoders is different from a first rank of the first set of precoders.

The rank may correspond to the number of linearly independent precoders in the respective set. For example, the first rank and the second rank may correspond to the number of precoders in the first set and the second set, respectively.

Furthermore, the second rank of the second set is less than the number of antenna ports. Each of the antenna ports is associated with non-zero energy by at least one of the precoders of the second set. The device 100 further comprises a transmission module 106 that transmits the RS using each of the precoders of the second set.

The first station may also be referred to as the transmitting station, since the first station is the station transmitting the RS. The transmitted RS may be the basis for determining the CSI. The CSI may be the basis for a subsequent data transmission. The data may be transmitted from the first station to the second station or, e.g., by virtue of reciprocity of the radio channel, by the second station to the first station.

At least one of the first station and the second station may be a node or a base station, e.g. a 3GPP eNode B (eNB) or a 3GPP gNode B (gNB), of a cellular telecommunications system. Alternatively or in addition, at least one of the first station and the second station may be a radio device, e.g., a mobile station (MS) or a user equipment (UE), connected or connectable with the cellular telecommunications system. The cellular telecommunications system may be a 3GPP system. The 3GPP system may comprise at least one of a General Packet Radio Service (GPRS), a Universal Mobile Telecommunications System (UMTS), an Evolved Packet System (EPS), a Next Generation System (NGS) and a Fifth Generation System (5GS).

The RS may be transmitted for a downlink from the base station as the first station to the radio device as the second station, for an uplink from the radio device as the first station to the base station as the second station, for a backhaul link between base stations as the first and second stations and/or for a sidelink between radio devices as the first and second stations. Alternatively or in addition, the RS may be transmitted for preparing a handover of a radio device as the second station between a source base station and a target base station as the first station, or for establishing a dual connectivity for a radio device as the second station served by the first station as a Primary Cell (PCell) or a Secondary Cell (SCell).

Figure 2:
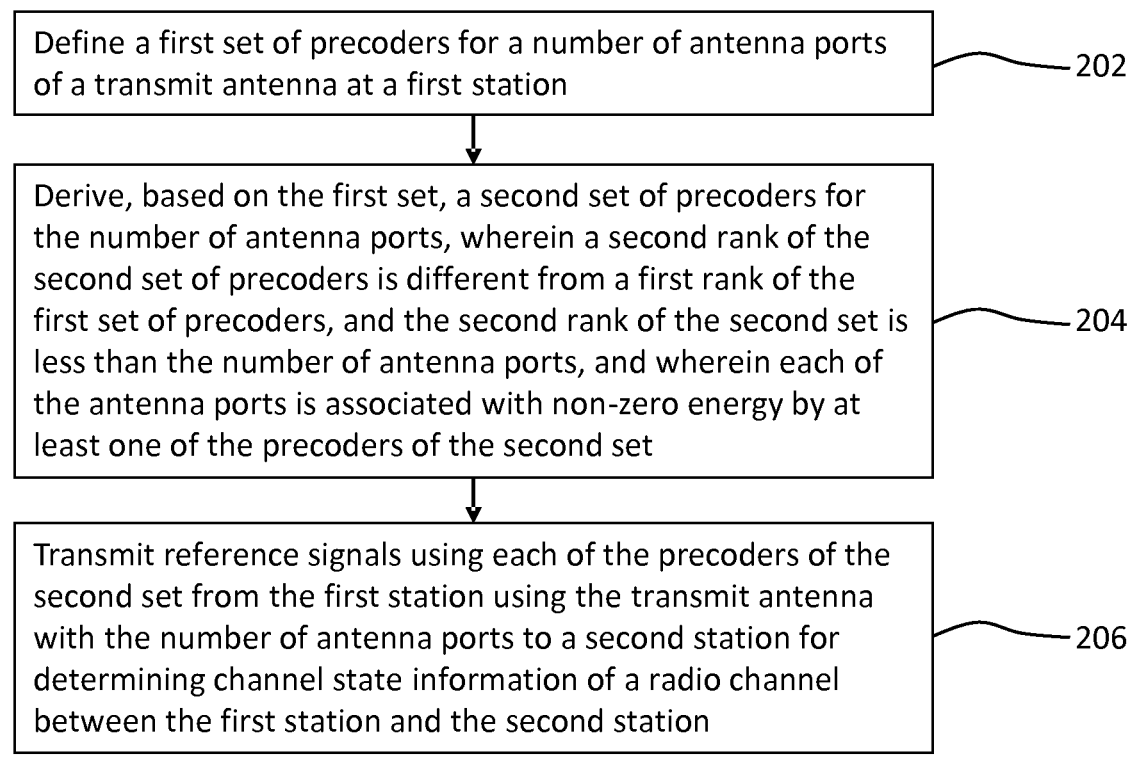
FIG. 2 shows a flowchart of a method embodiment for transmitting reference signals using a transmit antenna with a number of antenna ports.

FIG. 2 shows a flowchart for an implementation of a method 200 of transmitting RS from a first station using a transmit antenna with a number of antenna ports to a second station. The transmitted RS may enable the second station to determine and/or report CSI of a radio channel between the first station and the second station.

In a step 202 of the method 200, a first set of precoders is defined (e.g., provided) for the number of antenna ports. For example, the first set is predefined or stored in the device and/or the first station. The first set may be defined by a technical standard.

In a step 204 of the method 200, a second set of precoders is derived for the number of antenna ports based on the first set. A second rank of the second set of precoders is different from a first rank of the first set of precoders, and the second rank of the second set is less than the number of antenna ports. The second set may be specific for the first station, or even specific for the combination of the first station and the second station.

Each of the antenna ports is associated with non-zero energy by at least one of the precoders of the second set. The "at least one precoder" is not necessarily the same precoder for all antenna ports. That is, for any one of the antenna ports, there is at least one precoder in the second set that associates energy to the antenna port. The precoders of the second set are used for transmitting the RS from the first station in a step 206 of the method 200.

The transmit antenna may comprise a plurality of antenna elements. The antenna elements may be equally spaced, e.g., in one or more dimensions and/or on a flat or curved surface. The antenna ports may correspond to the antenna elements or may be (e.g., injectively) mapped to the antenna elements.

An example for the first set and/or the second set is a set of beamforming weight-vectors. The first set may be represented by DFT-based weight-vectors.

An example for deriving the second set from the first set may include combining or splitting the beams of the first set. Relative to the first set, the second set may increase and/or decrease the granularity in certain transmission directions and/or in certain subspaces of the radio channel spanned by the precoders of the first set (also referred to as first subspace, which may correspond to the channel space).

The method may be performed by the first station or another node of a network (e.g., a radio access network, RAN) that comprises the first station. The method 200 may be performed by one or more nodes of the network. Performing the method 200 may be realized by performing or triggering (e.g., controlling) the corresponding steps.

The radio channel between the first station and the second station may be referred to as a multiple-input multiple-output (MIMO) channel or a spatial multiplexing channel as umbrella terms also encompassing a multiple-input single-output (MISO) channel between the first station and the second station. The MIMO channel may be used for transmitting multiple independent layers (also: spatial streams). Herein, such layers are not necessarily (or not yet) carrying data. For the purpose of determining the CSI, the RS may be transmitted on such layers. From the perspective of the first station, each precoder (e.g., of the second set) may correspond to one layer.

The RS may be transmitted from the first station to multiple instances of the second station (referred to as "second stations") using the second set of precoders. That is, the RS transmitted in the step 206 may be received by different second stations. Each of the second stations may comprise a receive antenna with one or more antenna ports. That is, the radio channel may be a Multiple User MISO (MU-MISO) or MU-MIMO channel from the perspective of the first station. The radio channel may serve as a MISO or MIMO channel per second station. The expressions MIMO and spatial multiplexing are used as umbrella terms, which also encompass MISO, since the transmit antenna at the input side of the radio channel (i.e. at the first station) is fed through the number of antenna ports according to the precoders.

The first set of precoders and/or the second set of precoders may be referred to as a first codebook and a second codebook, respectively. The first set and/or the second set of precoders may be defined by a set of complex-valued weight-vectors, e.g., of size $N_T$, wherein $N_T$ is the number of antenna ports of the transmit antenna. For each of the first set of precoders and/or the second set of precoders, the set of weight-vectors may be represented by a precoder matrix (also: beamforming matrix) of size $N_T$ by r, wherein r is the rank of the respective matrix, i.e., the first rank and the second rank, respectively. Associating non-zero energy to each of the antenna ports means that none of the $N_T$ rows of the precoder matrix representing the second set is all-zero.

Figure 3:
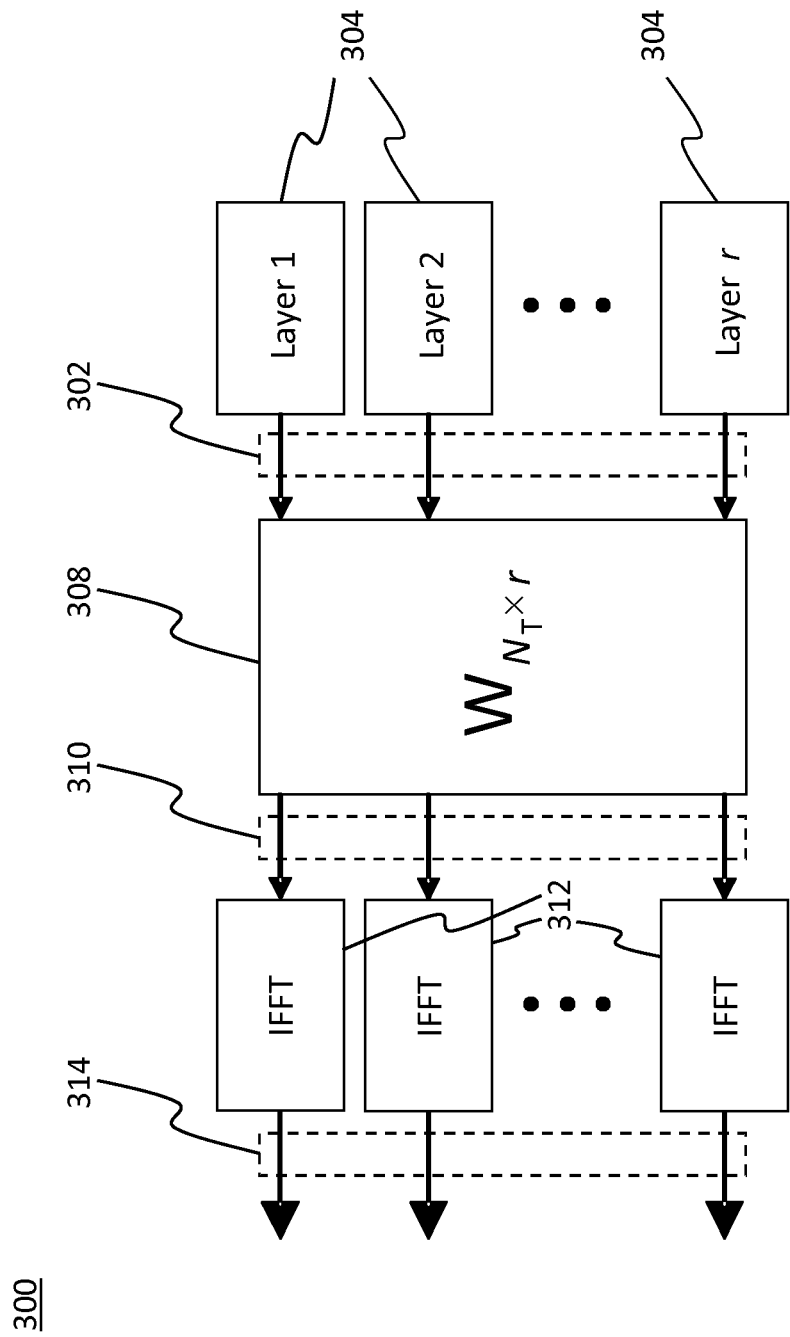
FIG. 3 shows a schematic block diagram for a transmitter stage, which is implementable at any device or for any method embodiment.

FIG. 3 shows a schematic block diagram of an example for a transmitter stage 300 of the first station. The transmitter stage 300 is compatible with any embodiment of the device 100. For example, the device 100 includes or controls the transmitter stage 300.

The transmitter stage 300 maps a symbol vector 302, s, comprising a layer modulation symbol (e.g., an orthogonal frequency-division multiplexing, OFDM, symbol) for each of r layers 304 to the number of $N_T$ antenna ports 314 by means of r precoders 308, e.g., represented by a precoder matrix W. Each of the layer modulation symbols may comprise a complex value (e.g., resulting from quadrature phase-shift keying, QPSK, or from a quadrature amplitude modulation, QAM, such as 16-QAM, 64-QAM or 256-QAM) for each resource element (RE) in time and/or frequency, e.g., for each subcarrier in a transmission time interval (TTI).

The r precoders 308 may be the precoders of the first set or, preferably, the precoders of the second set. More specifically, the precoders 308 map the r layer modulation symbols 302 to a set of $N_T$ port modulation symbols 310. Each of the port modulation symbols 310 is transformed from the frequency domain (e.g., in terms of subcarriers) to the time domain (e.g., in terms of a sampling rate) by inverse fast Fourier transformation (IFFT) 312 resulting in a set of $N_T$ baseband signals applied (e.g., after power amplification) to the $N_T$ antenna ports 314.

Each set of precoders 308 may be represented by such a precoder matrix W. The symbol vector s at reference signs 302 carries the information to be transmitted, e.g., the RS or data to be transmitted. As is schematically illustrated in FIG. 3, the symbol vector s is multiplied by the precoder matrix W of size $N_T \times r$. The precoder matrix W distributes the transmit energy in an r-dimensional subspace of the $N_T$-dimensional channel space 310 (corresponding to the $N_T$ antenna ports 314). The subspace is a proper subspace of the channel space for the second set, i.e., the rank r of the precoder matrix W for the second set of precoders 308 is less than $N_T$. The precoding rank r is also referred to as the transmission rank. Preferably, the transmission rank r, and thus the number of spatially multiplexed layers 304, is the number of columns of the precoder matrix W.

Each of the r layer modulation symbols in s is input to one of the r layer. In this way, spatial multiplexing is achieved, e.g., since multiple layer modules symbols are transmitted simultaneously over the same time and/or frequency resource element (TFRE). An LTE implementation uses OFDM in the downlink and DFT-precoded OFDM in the uplink. Hence, the TFRE labeled by n may correspond to a subcarrier n, e.g., for a given TTI. A transmission mode supporting the spatial multiplexing aims for high data rates in favorable channel conditions. The number of layer modulation symbols r is typically adapted to suit the current channel properties.

The second station comprises a receive antenna with $N_R$ antenna ports, $N_R \geq 1$. The vector $y_n$ of size $N_R \times 1$ received at the second station (for a certain TFRE, e.g., on a subcarrier n or a data TFRE n) may be represented by $$y_n = H_n W s_n + e_n \tag{1a}$$

e.g., for the purpose of channel estimation and/or determining the CSI. In Eq. 1a, the $e_n$ is a noise vector or interference vector (e.g., represented by a random variable obtained as realizations of a random process).

The precoders 308 may be wideband precoders, i.e., the precoder matrix W is constant over frequency. Alternatively, the precoder matrix W may depend on the frequency (e.g., the subcarrier), which may also be referred to as a frequency-selective precoders 308.

The precoder matrix W is often chosen to match the characteristics of the MIMO channel matrix $H_n$ of size $N_R \times N_T$, resulting in so-called channel dependent precoding. One is often striving for focusing the transmit energy into a subspace, which is strong in the sense of conveying much of the transmitted energy to the UE as the second station. For efficient performance, it is therefore central to obtain information about the channel $H_n$, this information is commonly referred to as channel state information (CSI).

In one variant compatible with any embodiment of the technique, the RS are transmitted in the step 206 in the direction from the first station to the second station, and the CSI based on measuring the RS is reported in the opposite direction from the second station to the first station. For example, the previous presented CSI-RS and beam sweeping implementations may transmit the RS in the step 206 in the downlink. The UE as an instance of the second station measures the RS and feeds back the CSI to the eNodeB as the first station.

In another variant compatible any embodiment, transmitter-receiver reciprocity is assumed. The second station estimates the CSI based on the transmission in the step 206 in the direction from the first station to the second station, and uses the CSI for a data transmission in the opposite direction (e.g., in the uplink) from the second station to the first station. This is mainly applicable in a time-division duplex (TDD) transmission on the radio channel between the first station and the second station. The enables a way to obtain CSI based on, for instance, sounding reference signal (SRS) transmission.

The variants may be combined. Each of the first station and the second station may transmit according to the CSI derived from the RS transmission 206 in one direction.

The LTE standard is currently evolving with enhanced MIMO support. A core component in LTE is the support of MIMO-antenna deployments and MIMO-related techniques. LTE Release 13 supports spatial multiplexing for 16 transmit antenna ports 314 with channel-dependent precoding 308, e.g., according to the document 3GPP TS 36.213 V13.5.0.

In LTE Release 10, further RS, namely the CSI-RS as a reference symbol sequence according to the document 3GPP TS 36.213 V10.13.0, was introduced for the intent to estimate channel CSI.

The CSI-RS provides several advantages over basing the CSI feedback on the common reference signals (CRS), which were used for that purpose in previous 3GPP releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS, a UE as the second station can estimate the effective channel the CSI-RS is traversing including the radio propagation channel and antenna gains. In more mathematical rigor, this implies that if a known CSI-RS signal x is transmitted, a UE as the second station is enabled to estimate the coupling between the transmitted signal and the received signal (i.e., the effective channel). Hence, e.g., if no virtualization is performed in the transmission at the first station, the received signal y can be expressed as $$y = Hx + e, \quad (1b)$$

and the UE estimates the effective channel H based on y.

For CSI feedback, 3GPP LTE has adopted an implicit CSI mechanism. A UE as the second station does not explicitly report e.g., the complex valued elements of a measured effective channel, but rather the UE recommends a transmission configuration for the measured effective channel. The recommended transmission configuration thus implicitly gives information about the underlying channel state. In LTE, the CSI feedback is given in terms of a transmission rank indicator (RI), a precoder matrix indicator (PMI), and one or two channel quality indicators (CQI). The report from the second station to the first station, which is indicative of CQI, RI and PMI, may be wideband or frequency-selective, e.g., depending on which reporting mode is configured.

The RI corresponds to a recommended number, r, of the layers 304 that are to be spatially multiplexed and thus transmitted in parallel over the effective channel.

The PMI identifies a recommended precoder 308 in a codebook, which contains precoders with the same number of rows for a data transmission as the number of antenna ports 314 used for the CSI-RS in the step 206. The precoder 308 relates to the spatial characteristics of the effective channel.

The CQI represents a recommended transport block size (e.g., a code rate). 3GPP LTE supports a transmission of one or two transport blocks simultaneous (on different layers 304) to a UE as the second station in a subframe (as the TTI). Each transport block is a separately encoded block of information. There is thus a relation between a CQI and a Signal-to-Interference and Noise Ratio (SINR) of the one or more spatial stream 304 over which the transport block or blocks are transmitted.

Figure 4:
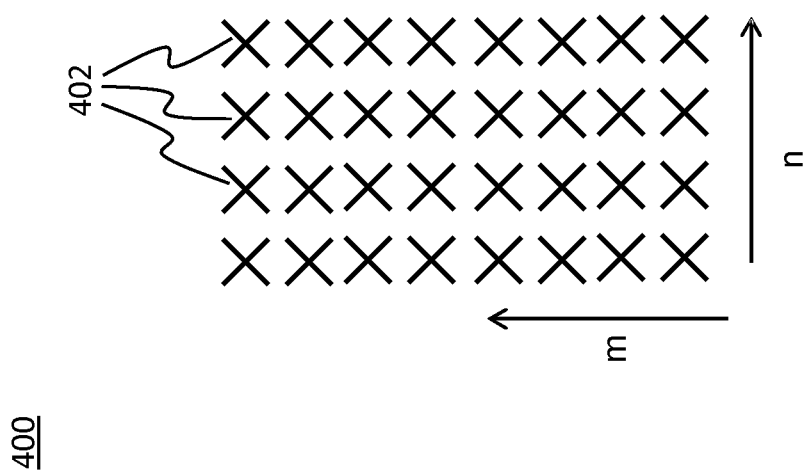
FIG. 4 schematically illustrates an example for an antenna array with orthogonally polarized antenna elements.

FIG. 4 schematically illustrates an embodiment of the transmit antenna 400 comprising an antenna array. In a two-dimensional antenna array, each antenna element 402 has an independent phase and amplitude control, thereby enabling beamforming in both in the vertical and the horizontal dimension. Such antenna arrays may be (e.g., partly) represented by the number of antenna columns corresponding to a horizontal dimension $M_h$, the number of antenna rows corresponding to a vertical dimension $M_v$, and the number of dimensions corresponding to different polarizations $M_p$. The total number of antenna elements 402 is thus $M = M_h M_v M_p$. A special subset of 2D antenna arrays are 1D arrays, which is the set of antenna arrays for $M_h = 1$ and $M_v > 1$, or $M_h > 1$ and $M_v = 1$.

An example of the transmit antenna, which is generically referred to by reference sign 400, is illustrated in FIG. 4 for $M_h = 4$ and $M_v = 8$. The transmit antenna 400 comprises cross-polarized antenna elements 402, meaning that $M_p = 2$. Such an antenna array may also be referred to as an 8×4 antenna array with cross-polarized antenna elements.

The concept of an antenna element 402 is non-limiting in the sense that it can refer to any virtualization (e.g., linear mapping) of a transmitted signal to the physical antenna elements 402. For example, groups of physical antenna elements may be fed the same signal, and hence they share the same virtualized antenna port when observed at the receiver. The receiving second station cannot distinguish and measure the channel from each individual antenna element within the group of antenna elements that are virtualized together. Therefore, when transmitting for instance CSI-RS corresponding to $N_T$ antenna ports, it is not necessarily so that $N_T$ equals the number of antenna elements used for the transmission. Hence, the number of antenna elements and the number of antenna ports may or may not be equal to each other.

For brevity and not limitation, the term antenna ports 304 is used herein as an umbrella term encompassing physical antenna elements 402 and/or virtualized antenna ports, e.g., depending on the application of the technique.

In the previous description of CSI-RS, notably Eq. (1b), so-called non-precoded CSI-RS were mentioned as a comparative example. For transmitting non-precoded CSI-RS, one CSI-RS antenna port is mapped to a single antenna element or a single antenna subarray of the antenna array of the transmit antenna 400. The CSI-RS in this case are cell-specific, i.e. broadcasted over the entire cell coverage area.

In contrast, the step 206 uses the plurality of precoders 308 in the second set, which is changed relative to the first set of precoders, for transmitting the RS. Different precoders 308 apply different phases or complex-valued gains to the antenna ports. For example, the step 206 uses a type of CSI-RS transmitting scheme introduced in 3GPP LTE Release 13, which is generically referred to as beamformed or precoded CSI-RS. These CSI-RS may be UE-specific instead of cell-specific, so that each UE as an instance of the second station is assigned a dedicated CSI-RS resource (e.g., a dedicated one of the layers 304 and/or precoders 308).

Transmitting such beamformed CSI-RS typically uses much fewer CSI-RS ports (or precoders) than transmitting non-precoded CSI-RS. Such beamformed CSI-RS typically span a narrower main beam compared to non-precoded CSI-RS. The beamformed CSI-RS can cover a specific one of the second stations (e.g., only the UE of interest) and not the entire cell coverage area. Using LTE terminology, non-precoded CSI-RS transmission schemes are denoted "Class A eMIMO-Type", while beamformed CSI-RS transmission schemes are denoted "Class B eMIMO-Type".

By way of example, the transmit antenna may comprise 8 physical antenna elements (or physical antenna ports 402, that is 8 "in-cables"). A conventional beam sweep may comprise transmitting non-precoded CSI-RS corresponding to 8 ports, e.g., using the first set comprising 8 conventional precoders. The step 206 may be implemented by a linear mapping of the 8 physical antenna ports 402 to, for instance, 4 CSR-RS ports by an 8×4 matrix W. Then, in the step 206, 4 precoded CSI-RS are transmitted using the corresponding 4 CSI-RS ports (which may also be referred to as virtualized antenna ports) resulting from the precoder matrix W.

In the step 206, the RS may be transmitted using the different precoders of the second set simultaneously and/or sequentially. For simultaneously transmitting the RS, the RS may be orthogonally coded. The RS that are transmitted at the same time using different precoders 308 (e.g., on different layers 304) may be mutually orthogonal.

An exemplary way of utilizing precoded or beamformed CSI-RS is to transmit a sequence of beamformed CSI-RSs in order to cover the entire cell coverage area or angular range, which is referred to as beam sweeping. To cover the entire cell (e.g., to cover all instances of the second station at different locations), the CSI-RS beam may be swept sequentially in time, e.g., by applying the precoders of the second set sequentially in the step 206. Beam sweeping is applicable to digital beamforming as well as analogue beamforming (e.g., by applying the phases or complex-valued gains specified by the respective precoder in the analogue domain). The beam sweeping may be performed in conjunction with analogue beamforming and/or at higher frequencies (e.g., at 6 GHz or higher), since an analogue-beamforming RAN and/or a RAN using such higher frequencies typically uses a wideband radio channel for the second station so that only a single beam can be transmitted in a given time instance.

Beam sweeping in the step 206 may be implemented by transmitting a sequence of different RS $x_k = w_k x_k'$ using different precoders $w_k$ labeled by k out of the second set of precoders, $W = [\ldots, w_k, \ldots]$. The UE as the second station can then measure the received signal corresponding to each precoder $w_k$ and feedback the CSI based on these measurements. Each precoder $w_k$ corresponds to a certain beam pattern and, thus, several different beams are transmitted in the step 206 for evaluation.

A drawback of a conventional beam sweeping procedure is that the number of precoders $w_k$ needed for RS transmission and evaluation increases as the number of antennas ports 314 in the transmit antenna (e.g., the antenna array) increases. The beam pattern generated by the transmit antenna is typically the more narrow the more antenna ports are used. In fact, in the case of N antenna ports 314 there are N transmissions needed in order to span the entire space channel. Hence, in terms of overhead, the conventional beam sweeping procedure becomes expensive as N becomes large.

The first set of precoders may be such a conventional (also: complete or fine-grained) set of precoders. The precoder matrix of the first set may be a unitary matrix, e.g. a DFT matrix. The first set may be used as the basis for deriving the second set of precoders in the step 204. The number of precoders in the second set may be significantly reduced by reducing the (e.g., directional) granularity of the beams of the second set in certain directions, e.g., without reducing the angular range of the second set compared to the angular range of the first set.

Figure 5:
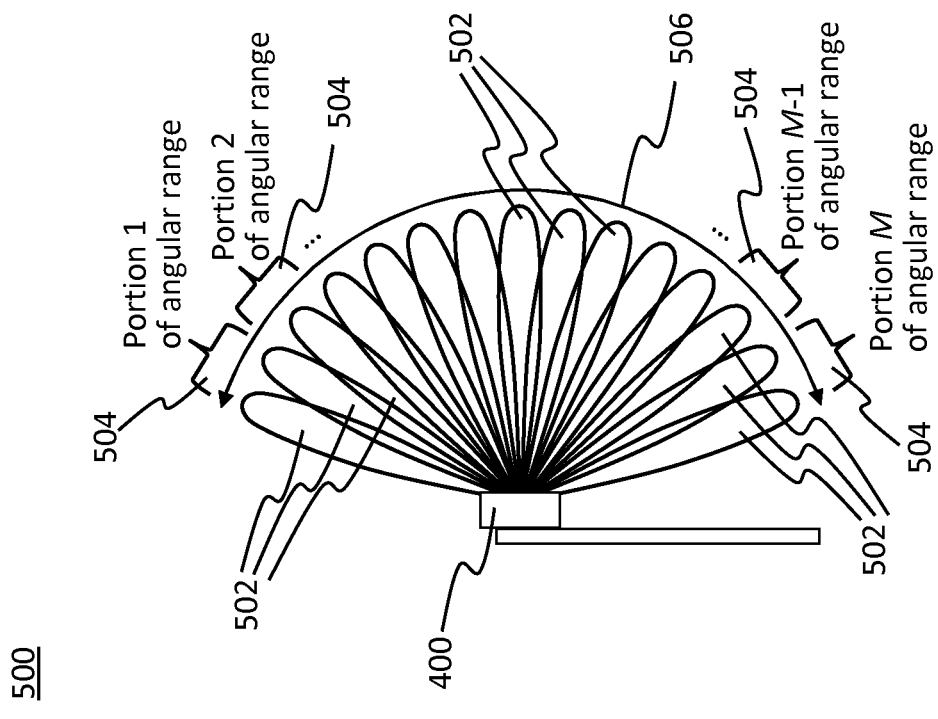
FIG. 5 schematically illustrates an example for an angular range covered by a first set of precoders.

An example of beam sweeping using a first set 500 is illustrated in FIG. 5. For brevity, the precoders (as vectors in the channel space) and the corresponding radiation patterns (e.g., beams) are referred to by the same reference sign 502.

In the example for the first set 500 schematically illustrated in FIG. 5, the transmit antenna 400 comprises N=15 independently controlled antenna ports 314. Consequently, 15 precoders 502 are needed to span the channel space and corresponding 15 beams 502 are conventionally swept in order to observe the entire channel space.

For the deriving step 204, the angular range 506 of the entire channel space is partitioned into M portions 504. The borders of the portions 504 may (or may not) be aligned with the beams 502 of the first set 500. E.g., the borders of the portions 504 may be located at local minima of the directional gain of the beams 502. The directional granularity of the second set of precoders is reduced compared to the first set in at least one of the M portions without reducing the covered angular range 506.

By reducing the granularity of the precoders in the second set, i.e., the second rank r is less than the number of antenna ports $N_T$, the granularity of the channel estimate (e.g., as represented by the CSI) is reduced. Thus, the CSI may be discussed in terms of the number of antenna ports, $N_T$, in order to describe how many orthogonal channel measurements are in principle required to estimate the CSI in complete detail. For discussing the antenna ports 314, the dimensionality of the channel space may be defined as the number of orthogonal channel measurements that, in principle, are required in order to estimate the radio channel at a given time and/or frequency resource. Hence, in the case of a transmit antenna 400 (e.g., an antenna array) with $N_T$ antenna ports, $N_T$ precoders are in principle necessary for transmitting the precoded RS and deriving the CSI in complete detail (i.e., in order to estimate the entire channel space), which is also referred to as an $N_T$-port CSI-RS. Consequently, the dimensionality of the channel space is $N_T$. For example, the first set of CSI-RSs are transmitted such that the total number of CSI-RSs within this set corresponds to $N_T$. This may for instance be the case when using a conventional beam sweep.

To be more explicit, a vector describing the channel space of a radio channel between a transmit antenna 400 (e.g., an antenna array) with $N_T$ antenna ports and a single receive antenna may be expressed as $h \in \mathbb{C}^N$. Thus, the set of possible channel vectors for the second stations (e.g., UEs in a cell of the first station) span an $N_T$-dimensional complex space, referred to as the channel space. A certain channel realization of the radio channel to one of the UEs corresponds to a one-dimensional channel subspace of $\mathbb{C}^N$.

The rank of the second set is reduced compared to $N_T$, because generally the set of actual layers (i.e., the usable spatial streams) to a certain UE do not span the entire $N_T$-dimensional complex channel space, but a smaller dimensional channel subspace (referred to as the second subspace), since the channel vectors h are typically not uniformly distributed in the vector space $\mathbb{C}^N$, e.g., due to the structure of the antenna array, the orientation of the transmit antenna of the first station relative to the second station and the propagation channel, i.e. the layers are typically spatially correlated.

Figure 6:
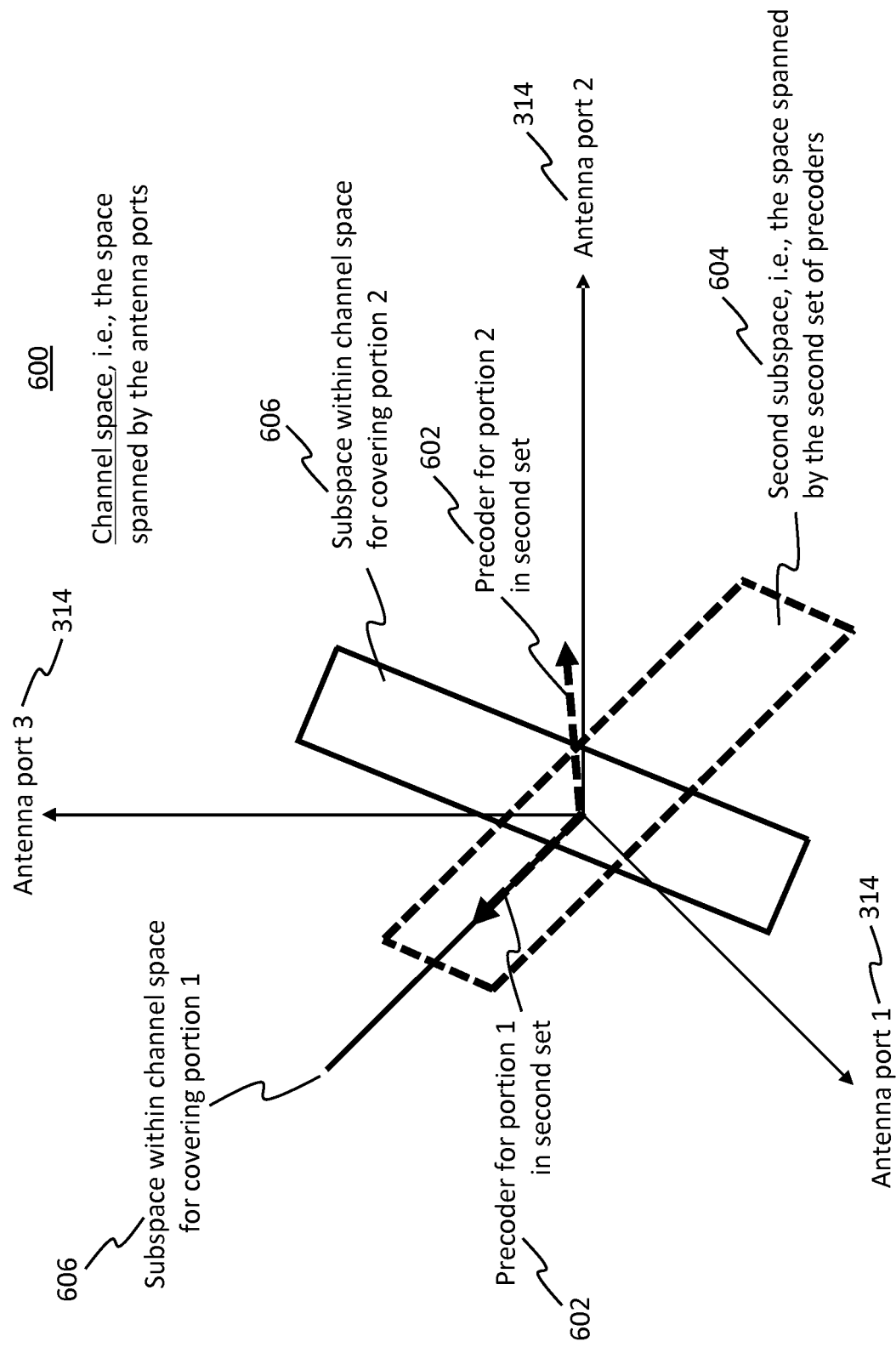
FIG. 6 schematically illustrates a channel space for a radio channel.

FIG. 6 schematically illustrates the channel space 600 spanned by the antenna ports 314. For covering a certain portion 504, the second set includes one or few precoders 602. The precoders 602 of the second set span the second subspace 604.

The number of precoders 602 for covering a certain portion 504 may be equal to or less than the dimension of a subspace 606 within the channel space 600 for covering the same portion 504 of the angular range 506. The former and latter cases are schematically illustrated in FIG. 6 for portions 1 and 2, respectively. That is, the portion 1 has finest granularity in the second set, and the granularity for the portion 2 is reduced in the second set.

The information, e.g., the CSI, retrieved from measuring the RS transmitted using the second set of precoders 602 (e.g., beamforming weights) $f_k$ is thus $h^H f_k$, i.e. the inner product between h and $f_k$, or equivalently, the projection of h on the second subspace 604 spanned by $f_k$. Several, say L, (e.g., orthogonal) CSI-RS transmissions are used in the step 206 for k=1, . . . , L, which may be described by the precoder matrix $F=[f_1 \ f_2 \ \ldots \ f_L]$. That is, the second rank r of the second set is L, and the precoder matrix W is referred to by the symbol F.

The information retrieved from measuring the RS transmitted in the step 206 is $h^H F$, which is the projection of the complete radio channel estimate in the channel space 600 on the second subspace 604 spanned by the measurement matrix F, i.e., the second set of precoders. If L is smaller than $N_T$, all possible dimensions of the channel space 600 are not observable, and so, the CSI is of less granularity than if $N_T$ measurements are conventionally used. That is, the CSI contains no information about the complementary space of the measurement space $h^H F^\perp$. It may of course be so that a certain channel realization $h_0$ (which spans one dimension of the channel space 600) may lie entirely in the measurement space F, or entirely in the complementary space $F^\perp$.

In general, spanning the angular range 506 of the channel space 600 with a lower number of virtual antenna ports 314 or precoders 602 provides coarser channel estimates than using a higher number of virtual antenna ports 314 or precoders 602 to span the same angular range 506 of the channel space 600. Hence, applying a higher number of virtual antenna ports 314 or precoders 602, to a given transmit antenna 400, may provide finer granularity in the channel estimates. Consequently, for determining CSI of the channel space 600 or a subspace 606 covering a certain portion 504 of the angular range 506, a set of precoders 602 (e.g., a set of CSI-RS) corresponding to X virtual antenna ports or X precoders is defined to have coarser granularity than another set of precoders 502 (e.g., a set of CSI-RS) corresponding to Y virtual antenna ports or Y precoders ports, if X<Y. The dimension of the channel space 600 or the subspace 606 for covering a certain portion 504 is larger than X. The subspace 606 within the channel space 600, which is spanned by precoders 502 with directions in the corresponding portion 504, and the subspace of the second subspace 604 (as well as the CSIs based on RS transmitted in said subspaces) represent different levels of granularity.

For brevity, the precoders (as vectors in the second subspace 604) and the corresponding radiation patterns (e.g., beams) are referred to by the same reference sign 602.

The technique allows obtaining CSI of the entire channel subspace 606 associated with a certain portion 504 or a subspace thereof in the second subspace 604, by using a lower amount of overhead than when performing a conventional CSI acquisition. This is done by, for instance, sweeping the radio channel with beams 602 corresponding to different levels of granularity. Hence, in some parts of the angular range 506, i.e., in at least one of the M portions 504, the CSI is obtained with finer granularity and in other parts, i.e., in at least one other portion 504, the CSI is obtained with a coarser granularly.

The different granularities are determined by the first station, e.g., based on a priori information about which parts of the radio channel (e.g., which directions) are most important to obtain CSI with fine granularity. The granularity may be determined based on a density of instances of the second station (e.g., UE density) in a certain direction and/or per solid angle.

Figure 7:
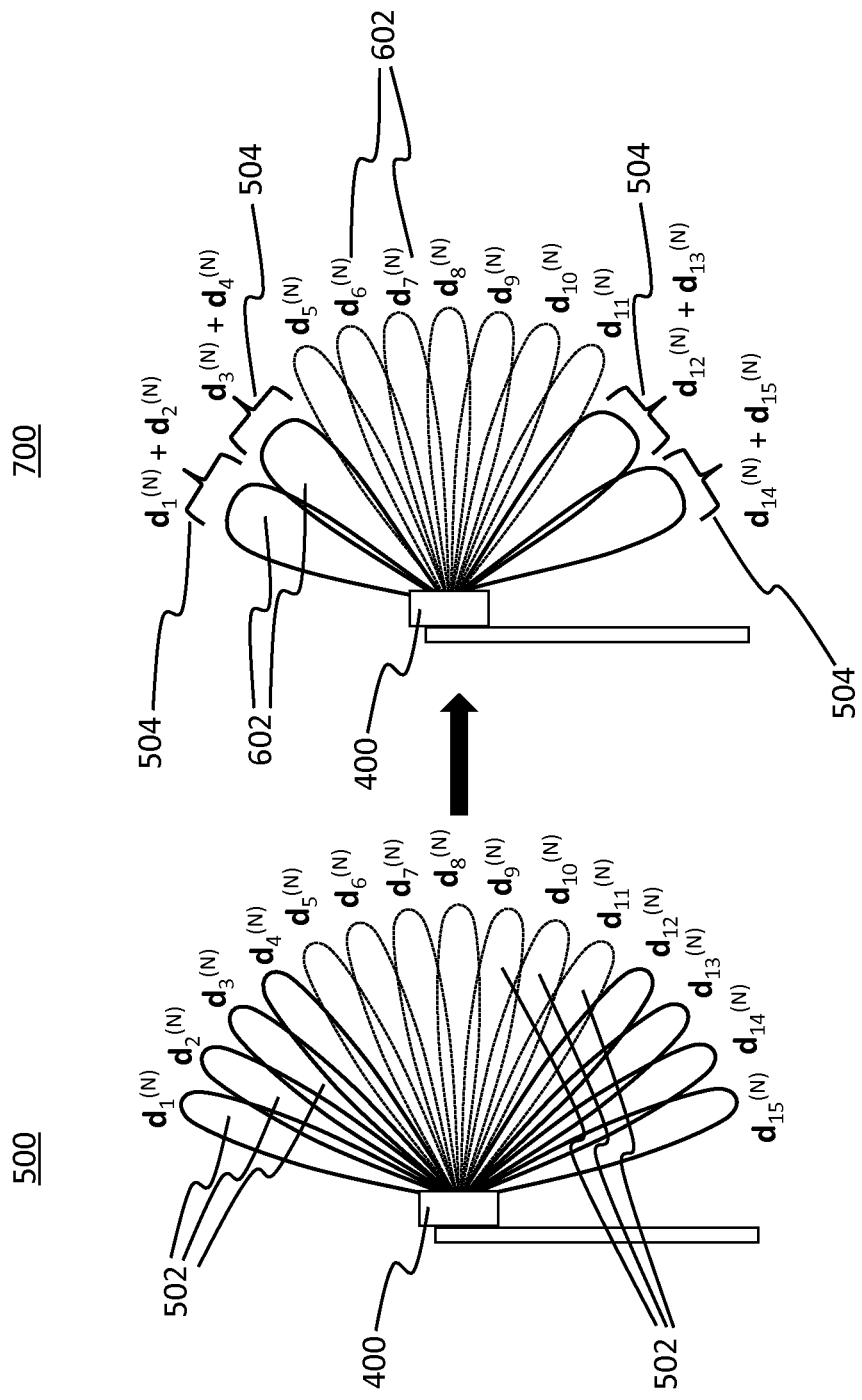
FIG. 7 schematically illustrates a first example for a derivation of a second set of precoders, which is implementable in any device or method embodiment.

FIG. 7 schematically represents a first example for the step 204 of deriving a second set 700 from the first set 500. The widths of the beams 502 of the first set 500 are similar or equal, and the directions of the beams 502 of the first set 500 are similarly or equally spaced. In at least one of the portions 504, all precoders 502 corresponding to beams 502 directed within said portion are summed up (e.g., by adding up the complex-valued gains or weights for each of the antenna ports 314) resulting in a combined precoder 602 with a corresponding wider beam 602.

The combination of beams 502 to generate a wider beam 602 is also referred to as beam merging. For beam merging, the first set 500 may correspond to a conventional set of precoders 502, which is not used in the transmitting step 206. The deriving step 204 is schematically illustrated in FIG. 7. In the left-hand side of FIG. 7, a conventional beam sweep corresponding to a high number of narrow beams 502, i.e., using the first set of precoders 502, is illustrated for comparison. In the right-hand side of FIG. 7, some of the narrow beams 502 are replaced by a fewer number of coarser (i.e., wider and non-overlapping) beams 602. This second set 700 of precoders 602 enables the base station as the first station to sweep the entire angular range 506 of the radio channel with a fewer number of beams 602. Hence, the cost in terms of overhead are reduces at the price of a reduced granularity in parts of the channel space 600.

Figure 8:
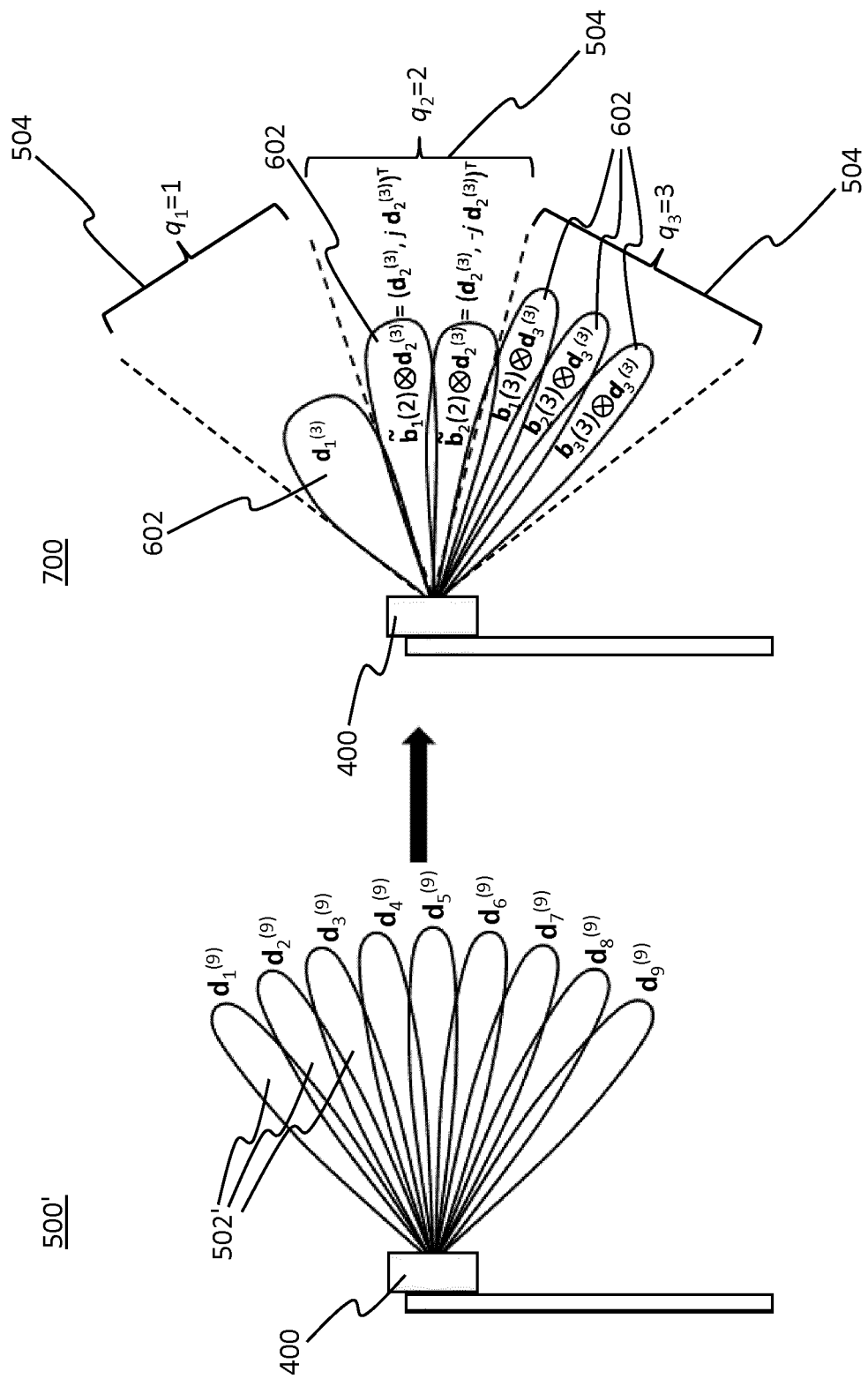
FIG. 8 schematically illustrates a second example for a derivation of a second set of precoders, which is implementable in any device or method embodiment.

FIG. 8 schematically represents a second example for the step 204 of deriving a second set 700 from the first set 500. It is not necessary that the first set 500 is a complete or conventional set of precoders, i.e. a set with full rank $N_T$, which is illustrated at reference sign 500'. The first set 500 has a coarser granularity, i.e. the rank is less than $N_T$, and the rank is refined only in those portions 504 of the angular range 506 where necessary.

Beam splitting may refine the directional granularity in at least one of the M portions 504. For concreteness and not limitation, a matrix D(s) corresponds to a DFT matrix (e.g., an inverse DFT matrix) of size s×s. The columns of an $N_T \times N_T$ DFT matrix $D^{(N_T)}$ are an example for a conventional set 500' of precoders 502', which are illustrated on the left-hand side of FIG. 8 for $N_T$=9.

Herein, the elements of $D^{(s)}$ may be represented by $$[D^{(s)}]_{k,l} = \frac{1}{\sqrt{s}} \exp\left(\frac{j2\pi kl}{s}\right) \text{ for } l, k \in \{0, 1, \ldots, s-1\}. \quad (2a)$$

The matrix $D^{(s)}$ according to Eq. (2a) is an example for a unitary matrix. Herein, any unitary matrix of size s×s be used as for the matrix $D^{(s)}$. Furthermore, the matrix $D^{(s)}$ may be modified, e.g., depending on the geometry of the transmit antenna 400.

In an embodiment, the transmit antenna 400 comprises a uniform linear array (ULA) (e.g., of length $N_T$), which is coupled or mapped to $N_T$ antenna ports 314. Hence, when using a conventional beam sweeping procedure, $N_T$ beams would be transmitted, and these conventional beams are, for instance, chosen such that they correspond to the columns of the matrix $D^{(N_T)}$ as an example for the conventional set 500'.

With the subject technique, the beam sweeping may be implemented as follows. The antenna ports 314 of the transmit antenna 400 (e.g., the antenna elements of the antenna array) are divided into K parts such that each part consists of $M=N_T/K$ of the antenna ports 314. In order to perform a beam sweep from one of the K parts with M antenna elements, M beams need to be transmitted and these correspond, for instance, to the columns of $D^{(M)}$. These M beams 502 may be a first set 500 of wide beams corresponding to a coarser granularity than the beams 502' in $D^{(N_T)}$, and may furthermore be mapped to the entirety of the $N_T$ antenna ports 314 (e.g., the whole antenna array 400) by using the columns of the precoder matrix 308

$$F = \begin{bmatrix} 1 \\ 0^{(K-1,1)} \end{bmatrix} \otimes D^{(M)}$$

as precoders 502 of the first set 500, wherein the matrix $0^{(i,j)}$ represents a zero matrix of size i×j and ⊗ denotes the Kronecker product.

The first station may determine a granularity $q_i \in \{1, \ldots, K\}$ for each portion $i \in \{1, \ldots, M\}$. The positive integer $q_i$ represents a desired or determined granularity level of the i-th portion 504, i.e. the beam splitting based on the i-th column in $D^{(M)}$ or F. The i-th column $d_i^{(M)}$ in $D^{(M)}$ is split up according to a Kronecker product into $q_i$ narrower beams 602 with different directions within the i-th portion 504. Hence, using a $q_i$>1 yields a finer granularity in the subspace 606 corresponding to the i-th column of F, e.g., the subspace 606 for covering the i-th portion 504. This may be done by using (e.g., instead of the M wide beams 502 of the first set 500) the L columns of the matrix precoder $$F' = [B(q_1) \otimes d_1^{(M)} B(q_2) \otimes d_2^{(M)} \ldots B(q_M) \otimes d_M^{(M)}] \quad (3a)$$

as the precoders 602 in the second set 700, i.e., as the precoder matrix W in the step 206 (e.g., for the beam sweeping), wherein $$B(q_i) = \begin{bmatrix} D^{(q_i)} \\ 0^{(K-q_i, q_i)} \end{bmatrix} \quad (4a)$$

is a matrix of size K×$q_i$, and $d_i^{(M)}$ is the i-th column of $D^{(M)}$. As pointed out above, the matrix $D^{(q_i)}$ may be any unitary matrix of size $q_i \times q_i$, e.g., a DFT matrix.

For example, for generating an even number of beams symmetrically to the center direction of the i-th portion 504 (without a main lobe in the center direction of the i-th portion 504), the matrix $D^{(q_i)}$ may be modified for even $q_i$ according to:

$$[D^{(s)}]_{k,l} = \frac{1}{\sqrt{s}} \exp\left(\frac{j2\pi k(l \pm 1/2)}{s}\right) \text{ for } l, \quad (2b)$$

$$k \in \{0, 1, \ldots, s-1\} \text{ if } s = q_i \text{ even,}$$

while using $D^{(s)}$ according to Eq. (2a) for s=$q_i$ odd.

Applying the precoder matrix W=F' splits the angular range 506 into M parts according to the matrix $D^{(M)}$, which correspond to the M portions 504 in the angular range and the M wide beams 502 according to the columns of $D^{(M)}$. The first of the M parts is further split into $q_1$ parts, the second part is further split into $q_2$ parts, and so on. Hence, by using F' in the transmitting step 206, the radio channel is swept with beams 602 corresponding to different levels of granularity as defined by the set $q_i$ for $i \in \{1, \ldots, M\}$.

The number of columns in F', and thus the number of beams and precoders 602 in the second set 700 (e.g., in the beam sweep), is $$L = \Sigma_{i=1}^M q_i.$$

It is noted that if $q_1 = q_2 = \ldots = q_M = 1$, then L=M and the precoder matrix 308 results in the example case F'=F. If, on the other hand, the maximum values for $q_i$ are used, i.e., $q_1 = q_2 = \ldots = q_M = K$, then L=M·K=$N_T$ beams are used and one achieves no dimensionality reduction compared to a conventional beam sweep. Any set of $q_i$-values in-between these two extreme cases may constitute a proper configuration for the transmit antenna 400 derived in the step 204, so that feedback overhead is traded for granularity in certain directions.

An advantageous property is that the beams 602 in the step 206 (e.g., in the beam sweep) be mutually orthogonal, or equivalently the columns of F' be orthogonal, so that transmission resources are not wasted. With the above embodiment, it is readily seen that this is the case, since $$(B(q_i) \otimes d_i^{(M)})^H (B(q_j) \otimes d_j^{(M)}) = ((B(q_i))^H B(q_j)) \otimes ((d_i^{(M)})^H d_j^{(M)})$$

$$= \begin{cases} 0^{(q_i, q_j)}, \text{ for } i \neq j \\ I^{(q_i)}, \text{ for } i = j \end{cases}.$$

The second example for the deriving step 204 is schematically illustrated in FIG. 8 for $N_T=9$. By choosing K=3 together with $q_1=1$, $q_2=2$ and $q_3=3$, beam sweeping is performed with 6 beams 602 instead of 9 conventional beams 502'. Notably, the beam sweeping is performed using different granularity levels in different portions 504 of the angular range 506 of the radio channel.

While a DFT matrix $D^{(q_i)}$ is used in $B(q_i)$ as an example in above embodiments, structures other than a DFT matrix are also applicable for $D^{(N)}$. Furthermore, all antenna ports 314 (e.g., the entire array of the transmit antenna 400) may be used in combination with virtualization of the antenna ports 314. For example, the matrix $B(q_i)$ for the beam splitting according to Eqs. (3a) and (4a) may be modified. In embodiments based on Eqs. (3a) and (4a), no power is transmitted on the subset of the antenna ports 314 corresponding to $0^{(K-q_i,q_i)}$ in the matrix $B(q_i)$. In a variant of such embodiments, a virtualization matrix C of size $K \times q_i$ is applied to generate the beams 602 according to the precoder matrix 308:

$$\tilde{F}=[\tilde{B}(q_1) \otimes d_1^{(M)} \tilde{B}(q_2) \otimes d_2^{(M)} \ldots \tilde{B}(q_M) \otimes d_M^{(M)}], \quad (3b)$$

wherein $$\tilde{B}(q_i)=C_i D^{(q_i)}, \quad (4b)$$

The precoders 602 represented by the columns of $\tilde{F}$ are used in the step 206 (e.g., for the beam sweep). Each of the rows of $C_i$ has at least one non-zero entry. Hence, due to this structure of $C_i$, non-zero power is put on all the available antenna ports 314.

In a first embodiment using virtualization, the virtualization matrix $C_i$ is configured in such a way that the resulting antenna pattern 602 from the i-th column of $\tilde{F}$ is substantially similar to the antenna pattern resulting from the i-th column of F'. Hence, in terms of beams 602 experienced from the perspective of the second station (e.g., a UE), the second sets 700 defined by F' and $\tilde{F}$ have very similar properties for the both cases.

A virtualization matrix $C_i$ with such properties, and thus corresponding antenna radiation patterns 602, may be generated using a numerical optimization algorithm.

In a second embodiment using virtualization, which is combinable with above first embodiment using virtualization, a cross-polarized antenna 400 (e.g., the embodiment of the antenna 400 schematically illustrated in FIG. 4) is used and the virtualization C projects $D^{(q_i)}$ onto both polarizations.

An explicit implementation of the second embodiment using virtualization for K=4 and $q_i=2$ may apply the virtualization matrix $$C = \begin{bmatrix} 1 & 0 \\ 0 & 1 \\ 1 & 0 \\ 0 & 1 \\ j & 0 \\ 0 & j \\ -j & 0 \\ 0 & -j \end{bmatrix},$$

C is of size $2K \times q_i$, wherein the first K rows correspond to the first polarization and the second K rows correspond to the second polarization. By using this virtualization matrix, all columns of $\tilde{B}(2)=CD^{(2)}$ will be non-zero and, thus, non-zero power is output on all antenna ports 314. Furthermore, the resulting antenna pattern 602 generated by the i-th column of $\tilde{B}(2)$ has properties very similar to the antenna pattern resulting from the i-th column of B(2) (for both the case when B(2) is applied to only one polarization or the case when B(2) is applied to both polarizations by using $$\begin{bmatrix} B(2) \\ B(2) \end{bmatrix}).$$

In a further embodiment, which is combinable with any of the above embodiments, each of the K parts of the transmit antenna 400 corresponds to a subarray. The subarray furthermore constitutes an analog implementation, meaning that only a wideband virtualization can be used, i.e. only one virtualization $d_i^{(M)}$ may be transmitted on each time slot, whereas the antenna subarrays are combined in a digital manner, meaning that a frequency-selective "combining virtualization" $B(q_i)$ may be used. In one embodiment the beams are multiplexed in the frequency domain such that more than one beam corresponding to column i in F' is transmitted at a given time instant.

By way of example, the portions 504 defined by the coarse virtualizations $d_i^{(M)}, i=1, \ldots, M$, are split into $q_i$ beams with $1 \leq q_i < K$ for each of at least two different frequencies (e.g., different carriers or resource blocks). The "combining virtualization" $B(q_i)$ may be frequency-selective in that the rows of $B(q_i)$ are permutated according to different permutations for different frequencies (e.g., different carriers or resource blocks).

Figure 9:
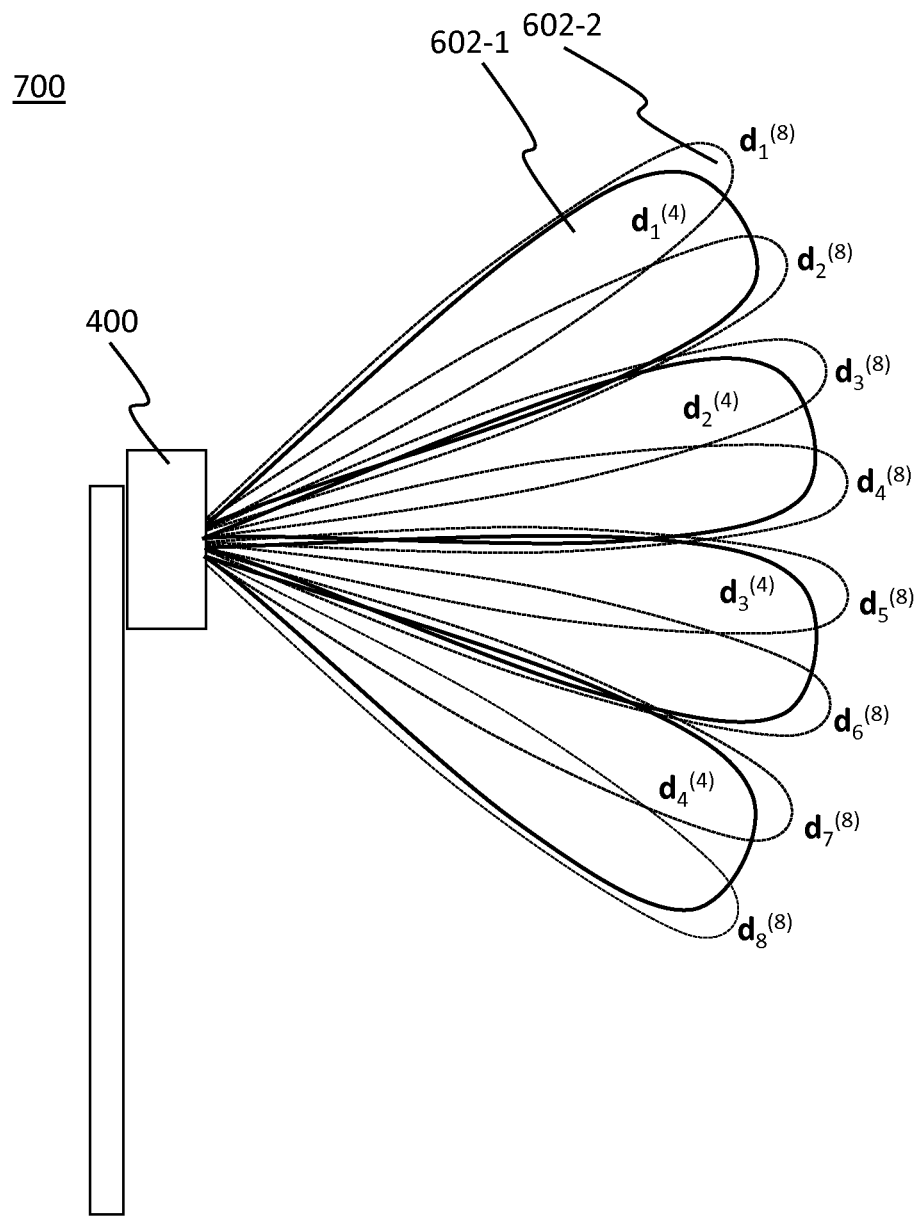
FIG. 9 schematically illustrates a third example for a second set of frequency-selective precoders, which is implementable in any device or method embodiment.

FIG. 9 schematically illustrates an embodiment for frequency-selective granularity, which is combinable with any of the above embodiments. The precoder matrix 308 used in the step 206 may have different ranks for different frequencies. For example, the precoder matrix $$F = \begin{bmatrix} 1 \\ 0^{(K-1,1)} \end{bmatrix} \otimes D^{(M_1)}$$

for generating $M_1=4$ beams 602-1 is used for a first frequency or first carrier, and the precoder matrix $$F = \begin{bmatrix} 1 \\ 0^{(K-1,1)} \end{bmatrix} \otimes D^{(M_2)}$$

for generating $M_2=8$ beams 602-2 is used for a second frequency or second carrier.

Alternatively or in combination, beam splitting and/or beam merging may be applied in a frequency-selective manner. For example, the granularities $q_i$ are different for different frequencies or different carriers.

In another embodiment, which is combinable with any of the above embodiments, a codebook comprising the $q_i$ precoders for the i-th portion of the M portions is used. Different (e.g., orthogonal reference signals) are (e.g., simultaneously) transmitted using the $q_i$ different precoders in the codebook, respectively. The resulting combined reference signal for CSI acquisition among the $q_i$ precoders covering the i-th portion is also referred to as a $q_i$-port CSI-RS. In the step 206 (e.g., in a beam sweep) a $q_1$-port CSI-RS is virtualized according to $$S_{CSI-RS}(q_1) \otimes d_1^{(M)},$$

wherein $S_{SCI-RS}(q_1)$ denotes a $q_1$-port CSI-RS signal. The second station (e.g., a UE) reports back to the first station (e.g., a base station) a recommended precoder $d_1^{(q_1)}$ out of the codebook, e.g., by means of a codebook index, which corresponds to a beam 602, e.g., according to:

$$\begin{bmatrix} d_1^{(q_1)} \\ 0^{(K-q_1,q_1)} \end{bmatrix} \otimes d_1^{(M)}.$$

The reported precoder is used for transmitting data within the subspace 606 defined by $d_1^{(M)}$, i.e. in the first portion 504. Hence, performing this operation in the same manner also as $S_{CSI-RS}(q_2) \otimes d_2^{(M)}$, $S_{CSI-RS}(q_3) \otimes d_3^{(M)}$ and so on provides CSI that enables the base station to decide on a suitable beam for data transmission. Optionally, these different CSI-RSs are combined using a class B CSI-RS meaning that the second station only needs to report one of the resulting precoders.

In those of the previous embodiments, which include an all-zero row in the matrix $B(q_i)$, e.g., those embodiments using Eq. (4a), not all of the antennas are used to form the beams 602 swept with coarser granularity. For example $B(q_i)$ according to Eq. (4a) contains zero entries if $q_i<K$. As pointed out above, unused antenna ports 314 can be avoided by using virtualization. Alternatively or in addition, the transmitting step 206 (e.g., the beam sweep) is done using a digital implementation. The different precoders 602 in the second set are applied for transmitting RS on different frequencies (e.g., simultaneously). That is, the RS are spread in the frequency domain rather than in the time domain (as in the case of a beam sweep). This means that the transmit power for a single antenna port 314 may be spread out across frequency, so that the antenna port 314 is transmitting at some frequencies but is silent at other frequencies, and still meet a transmit power constraint since this is usually defined as the sum over all frequencies.

In any embodiment, the available antenna ports 314 of the transmit antenna 400 (and, optionally, their associated power amplifiers) may be better utilized by transmitting different beams 602 from different subsets of antenna ports 314. These subsets may overlap. For instance, a cyclically rotated B-matrix may be used, wherein each of the M beams 602 are transmitted with a different cyclic rotation antenna offset $\Delta a$, as for example:

$$B(q_i)_{\Delta a} = \begin{bmatrix} 0^{(\Delta a, q_i)} \\ D^{(q_i)} \\ p^{(K-\Delta a - q_i, q_i)} \end{bmatrix}$$

and $$F'' = [B(q_1)_0 \otimes d_1^{(M)} \; B(q_2)_1 \otimes d_2^{(M)} \; \cdots \; B(q_M)_{M-1} \otimes d_M^{(M)}].$$

Different beams 602 are transmitted in the step 206 on different subsets of antenna ports 314. Furthermore, at least some of the beams may be transmitted with different granularities, i.e., may use a different number of antennas. The cyclic rotation antenna offsets may be optimized for each beam 602 in order to as evenly as possible spread the use of antenna ports 314 over the different beams 602.

Figure 10:
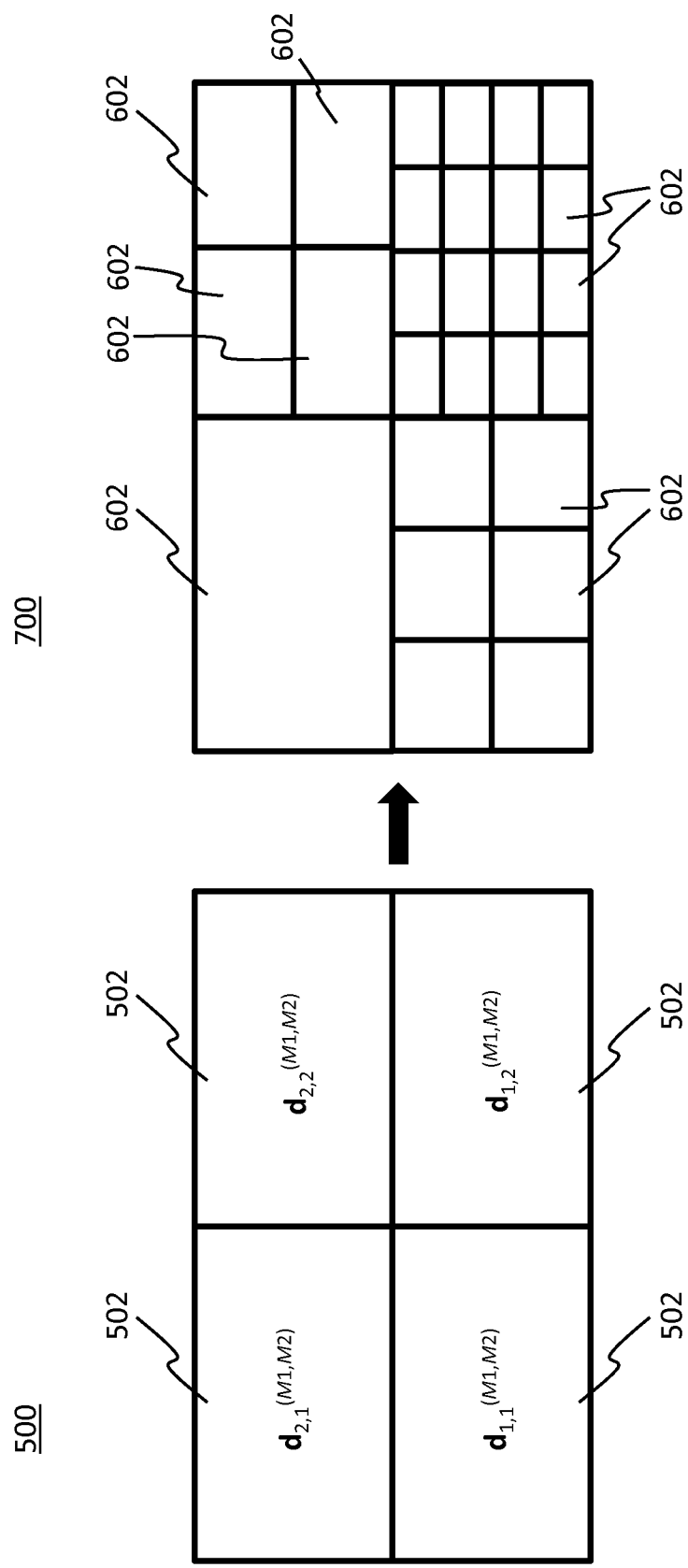
FIG. 10 schematically illustrates a fourth example for a derivation of a second set of two-dimensional precoders, which is implementable in any device or method embodiment.

While previous embodiments are presented for an 1D antenna array as the transmit antenna 400, these embodiments are readily and beneficially applicable for 2D antenna arrays. FIG. 10 schematically illustrates a 2D antenna array.

For instance, the transmit antenna 400 comprises a (e.g., uniform and planar) 2D antenna array with $N_1$ antenna elements in the first dimension (e.g., the horizontal dimension) and $N_2$ antenna elements in the second dimension (e.g., the vertical dimension). That is there are $N_1 N_2$ antenna ports 314. A set of 2D DFT beams 502 spanning the whole channel space may be constructed using a 2D DFT matrix $D^{(N_1,N_2)}=D^{(N_1)} \otimes D^{(N_2)}$. Correspondingly, in an embodiment, the antenna ports 314 may be split up in $K_1=N_1/M_1$ parts along the first dimension and $K_2=N_2/M_2$ parts along the second dimension, i.e. into $K=K_1 \cdot K_2$ parts in total, where $M_1$ and $M_2$ denotes the number of antenna elements within each part in each dimension, respectively. In order to perform a complete beam sweep from one of the K parts, corresponding to $M=M_1 M_2$ antenna elements, M beams need to be transmitted and these beams 502 may for instance correspond to $D^{(M_1,M_2)}$.

The first station may receive or determine $q_{i_1,i_2}^{(1)} \in \{1, \ldots, K_1\}$ and $q_{i_1,i_2}^{(2)} \in \{1, \ldots, K_2\}$, for $i_1 \in \{1, \ldots, M_1\}$ and $i_2 \in \{1, \ldots, M_2\}$, with the purpose that $q_{i_1,i_2}^{(1)}$ represents a desired granularity level, in the first dimension, of a beam 602 (i.e. column) in $D^{(M_1,M_2)}$ corresponding to $d_{i_1,i_2}^{(M_1,M_2)} = d_{i_1}^{(M_1)} \otimes d_{i_2}^{(M_2)}$. And $q_{i_1,i_2}^{(2)}$ represents the granularity level of the second dimension for the beam 602 corresponding to $d_{i_2}^{(M_1,M_2)}$. Hence, by choosing $(q_{i_1,i_2}^{(1)}, q_{i_1,i_2}^{(2)})$ an appropriate granularity for the subspace 606 corresponding to the column $d_{i_1,i_2}^{(M_1,M_2)}$ in $D^{(M_1,M_2)}$ is controlled.

The beams 602 may be generated using the columns from the precoder matrix 308:

$$F' = [A_{1,1} A_{1,2} \cdots A_{1,M_2} A_{2,1} A_{2,2} \cdots A_{2,M_2} \cdots A_{M_1,1} A_{M_1,2} \cdots A_{M_1,M_2}],$$

wherein $$A_{i_1,i_2} = B(q_{i_1,i_2}^{(1)}, q_{i_1,i_2}^{(2)}) \otimes d_{i_1,i_2}^{M_1,M_2)}$$

with $$B(q_{i_1,i_2}^{(1)}, q_{i_1,i_2}^{(2)}) = \begin{bmatrix} D^{(q_{i_1,i_2}^{(1)})} \\ 0^{(K_1-q_{i_1,i_2}^{(1)}, q_{i_1,i_2}^{(1)})} \end{bmatrix} \otimes \begin{bmatrix} D^{(q_{i_1,i_2}^{(2)})} \\ 0^{(K_2-q_{i_1,i_2}^{(2)}, q_{i_1,i_2}^{(2)})} \end{bmatrix}.$$

Using F', appropriately mapped to the antenna elements, first splits the channel space into $M=M_1 \cdot M_2$ parts (corresponding to the M beams in $D^{(M_1,M_2)}$ or the M portions 504 in 2 angular dimensions). The part corresponding to $d_{1,1}^{M_1,M_2}$ is further split into $q_{1,1}^{(1)} \times q_{1,1}^{(2)}$ parts, the part corresponding to $d_{1,2}^{M_1,M_2}$ is further split into $q_{1,2}^{(1)} \times q_{1,2}^{(2)}$ parts and so on. Hence, by utilizing F' it is possible to sweep the radio channel with beams 602 corresponding to different levels of granularity as defined by the sets $q_{i_1,i_2}^{(1)}$ and $q_{i_1,i_2}^{(2)}$, for $i_1 \in \{1, \ldots, M_1\}$ and $i_2 \in \{1, \ldots, M_2\}$.

One such embodiment is illustrated in FIG. 10 for $M_1=M_2=2$, which divides the 2-dimensional angular range (i.e., a solid angle) into $M=4$ parts as illustrated by the left-hand side of FIG. 10 at a conceptual level. These M parts are further split as illustrated at the right-hand side part of FIG. 10. In the example illustrated in FIG. 10, it has been assumed that $(q_{1,1}^{(1)}, q_{1,1}^{(2)})=(3,2)$, $(q_{1,2}^{(1)}, q_{1,2}^{(2)})=(4,4)$, $(q_{2,1}^{(1)}, q_{2,1}^{(1)}, q_{2,1}^{(2)})=(1,1)$ and $(q_{2,2}^{(1)}, q_{2,2}^{(2)})=(2,2)$. Hence, the 2-dimensional angular range is covered by 27 beams 602 corresponding to different levels of granularity.

Any of the embodiments, which start from coarse granularity beams 502 and then split these into multiple beams 602 in order to obtain finer granularity beams, may alternately or additionally apply the opposite approach, namely to start with a set of fine granularity beams 502 and then merge sets of these together, e.g., as described for the first example of FIG. 7.

For example, in one embodiment using an 1D antenna array of length $N_T$, a set of fine granularity beams 502 are obtained by using $D^{(N_T)}$, e.g., correspond to a DFT matrix. Some of these beams may be kept as the beams 602, whereas some may be merged together resulting in one of the beams 602. For instance, two or more adjacent beams 502 are replaced by a beam 602 with a pointing direction corresponding to a direction that is between the pointing direction of the original beams 502. Optionally, the beam 602 derived by beam merging in the step 204 is made wider by performing some kind of tapering.

In a variant compatible with any embodiment, a Gram-Schmidt orthogonalization procedure is applied in order to post process the beams resulting from the step 204, e.g., merged beams, before using the post-processed beams in the step 206. Preferably, the post-processing results in beams 602 that are orthogonal to each other. Using orthogonalized beams 602 can be beneficial, as pointed out above, for resource efficiency.

Hence, by utilizing such a post-processing procedure, an orthogonal second set 700 of beams 602 can be generated for beam sweeping that corresponds to different granularity levels.

Any of above embodiments may determine the required granularity of the channel subspaces as follows. In order to utilize the herein proposed method 200 and to achieve a technical benefit, one may first determine appropriate granularities for each channel subspace 606, e.g. what $q_i$-values are suitable for the M portions 504.

Any of the following examples, or any combination thereof, may be used for determining the granularity. In a first example, a number of full-dimensional beam sweeps is performed in a first step, in order to gather statistics about which beam directions are typically chosen by the UEs. Based on the gathered statistics, the transmitter may identify which sets of fine-granularity beams are chosen less often as the preferred beam by the UEs and correspondingly perform beam sweeps with lower granularity in the channel subspaces corresponding to said sets of fine-granularity beams.

In a second example, a priori knowledge about a deployment of the transmit antenna 400 and/or its propagation environment is determines the granularities of each channel subspace 606 in the second set 700. Such knowledge may, for instance, be obtained by manual inspection of the surrounding environment when deploying the transmit antenna 400 (e.g., an antenna array), such as the locations of adjacent building, levels of rooftops, blocking objects, etc. For instance, if the antenna is deployed on the top of a building, it is typically so that the strongest propagation paths are either diffractions around the edges and roofs of buildings, or specular reflections. Channel subspaces 606 corresponding to such likely propagation paths could thus be swept with fine granularity, while other (i.e., less likely) channel subspaces 606 may be swept with coarser granularity.

In a third example, statistical information about typical user distributions in certain generic deployment scenarios may determine the granularities.

The method 200 may be iteratively performed. In some implementations of the method 200, the granularities are dynamically updated in each new beam sweep, based on beam selections by instances of the second station in one or more of the previous beam sweeps. For instance, if a channel subspace 606 or angular portion 504, which has been swept with a coarse granularity, starts to get selected by many UEs, the granularity in this subspace or portion may be increased (i.e., refined), and so, in an embodiment, the transmitter dynamically changes the virtualization to provide a finer granularity in that subspace or portion. Correspondingly, if another channel subspace or portion that has been swept with a fine granularity is not selected as often by UEs, the first station determines a coarser granularity in that subspace or portion in subsequent beam sweeps. In another embodiment, MU-MIMO transmission is used, multiplexing several UEs on the same time-frequency resources. In this case, a fine-granular CSI may be needed to spatially separate the transmissions to two or more UEs if they are located in "adjacent" channel subspaces. Thus, if the first station detects that two or more UEs select the same coarse-granular beam, the first station may in the subsequent beam sweep update in the step 204 the second set (i.e., the virtualization for the RS transmission in the step 206) so that said subspace or portion is swept with a finer granularity, so as to receive more fine-granular CSI enabling spatial separation of transmissions from and/or to the UEs.

In previous embodiments the beams corresponding to different granularity are created by splitting and/or merging beams. The technique is not limited to generate the beams 602 in such ways. In any variant of the previous embodiments, a numerical optimization-based procedure derives the beams 602 in the step 204 by optimizing all the beams 602 in parallel.

Moreover, in previous embodiment beam sweeping of the full angular range 506 has been described. The technique is equally applicable if beam sweeping is performed only over a subspace of the channel space or a certain fraction of the angular range.

Figure 11:
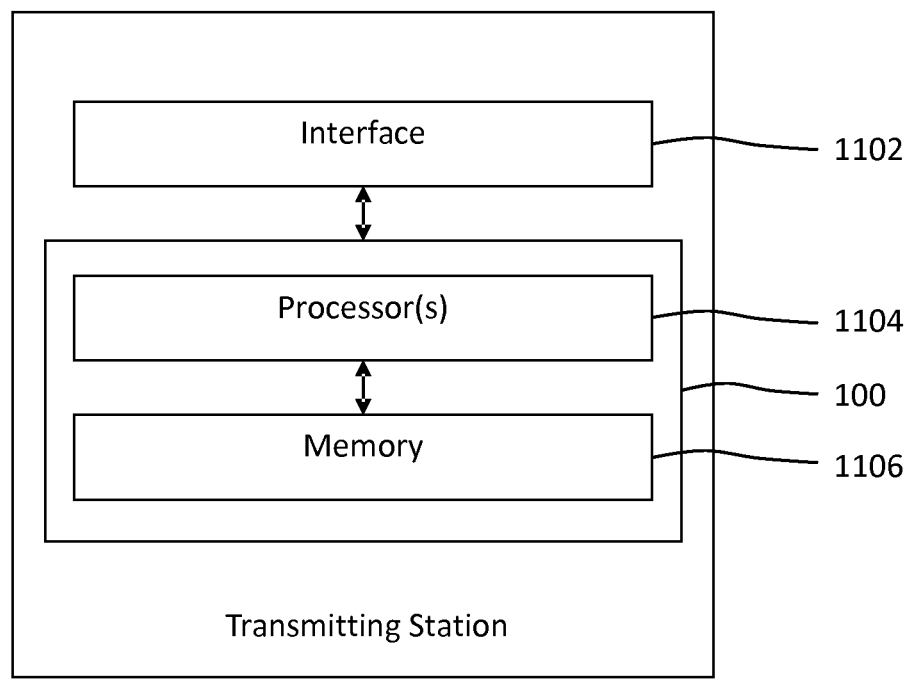
FIG. 11 shows a schematic block diagram of an embodiment of the device in a transmitting station, which is combinable with any device or method embodiment.
Figure 12:
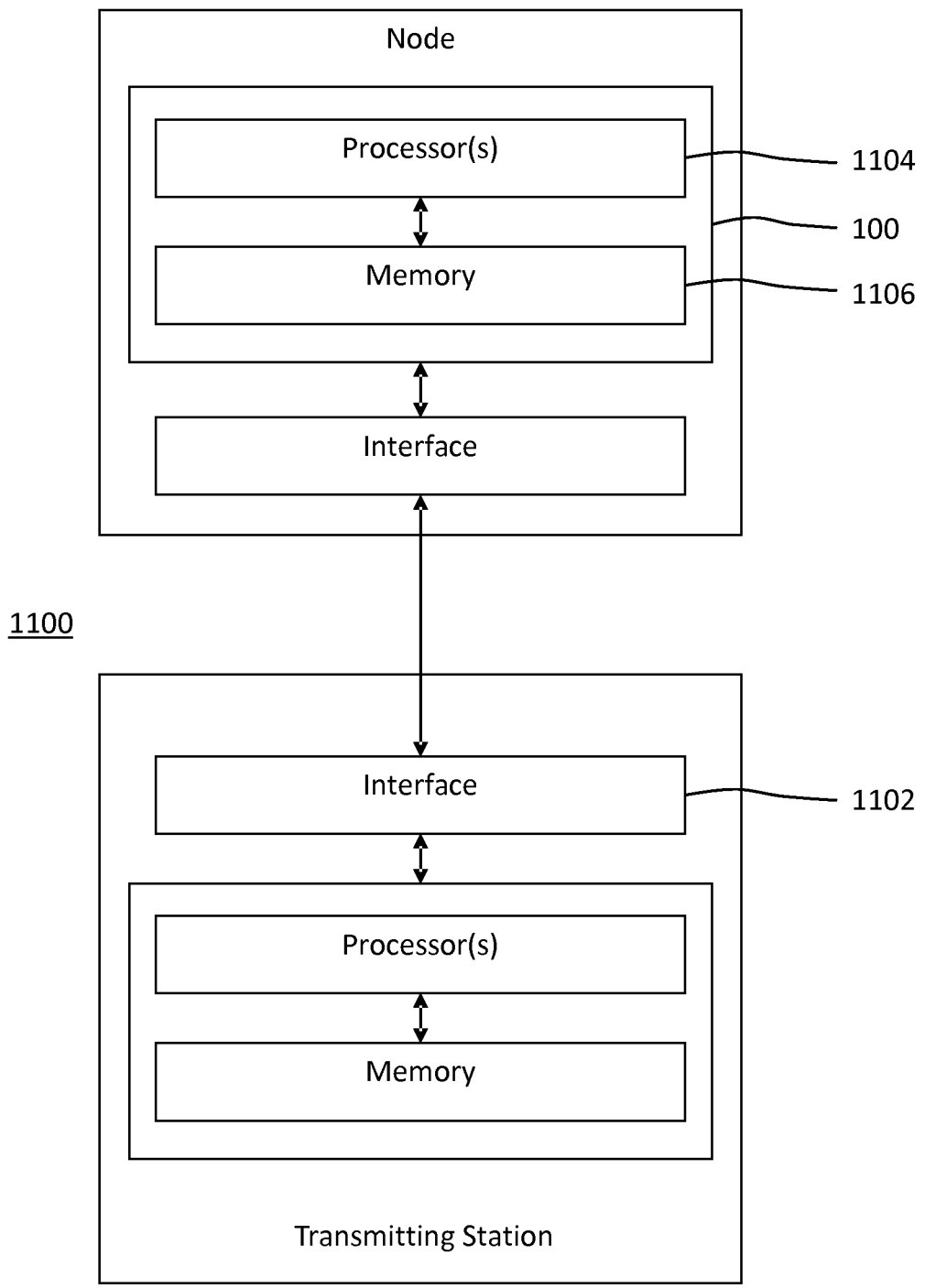
FIG. 12 shows a schematic block diagram of an embodiment of the device in multiple network nodes, which is combinable with any device or method embodiment.

FIG. 11 shows a schematic block diagram for an embodiment of the device 100. The device 100 comprises one or more processors 1104 for performing the method 200 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, RS transmitter functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a transmitting station 1100, e.g., the first station. The transmitting station 1100 comprises a radio interface 1102 coupled to the device 100 for radio communication, e.g., in the transmitting step 206, with one or more receiving stations, e.g., instances of the second station.

In a variant, e.g., as schematically illustrated in FIG. 3.2, the functionality of the device 100 is provided by another node of a radio network. That is, the node performs the method 200. The functionality of the device 100 is provided by the node to the transmitting station 1100, e.g., via the interface 1102 or a dedicated wired or wireless interface.

As has become apparent from above description, embodiments of the technique allow probing (e.g., sweeping) different parts of a radio channel with different granularity. Same of further embodiment can exploit a priori information about which parts of the channel where it is most important to obtain CSI corresponding to fine granularity. This information may for instance be known based on previous measurements or based on the actual deployment. This knowledge can hence be exploited so that the cost in terms of overhead are reduced, e.g., as a trade-off between reduced granularity in parts of the channel space and signaling overhead.

Many advantages of the present invention will be fully understood from the foregoing description, and it will be apparent that various changes may be made in the form, construction and arrangement of the units and devices without departing from the scope of the invention and/or without sacrificing all of its advantages.

The invention claimed is:

1. A method of transmitting reference signals (RS) from a first station, using a transmit antenna with a number of antenna ports, to a second station for determining channel state information (CSI) of a radio channel between the first station and the second station, the method comprising:
defining a first set of precoders for the number of antenna ports;
deriving, based on the first set, a second set of precoders for the number of antenna ports, wherein a second rank of the second set of precoders is different from a first rank of the first set of precoders, and the second rank of the second set is less than the number of antenna ports, and wherein each of the antenna ports is associated with non-zero energy by at least one of the precoders of the second set; and
transmitting the RS using each of the precoders of the second set;
wherein each of the precoders of at least one of the first set and the second set corresponds to one or more beams, and
wherein deriving the second set from the first set includes splitting a beam corresponding to a precoder of the first set into multiple beams each corresponding to a precoder of the second set, or merging two or more beams each corresponding to a precoder of the first set into a beam corresponding to a precoder to the second set.

2. The method of claim 1, wherein the first rank is the number of precoders in the first set, and/or the second rank is the number of precoders in the second set.

3. The method of claim 1, wherein the first rank is equal to the number of antenna ports.

4. The method of claim 1, wherein the second rank is less than the first rank.

5. The method of claim 1, wherein the precoders in the first set and/or the second set are linear precoders.

6. The method of claim 1, wherein at least one or each of the precoders of the second set is a linear combination of the precoders of the first set.

7. The method of claim 1, wherein each beam is associated with a direction and/or a width.

8. The method of claim 7, wherein the deriving the second set comprises increasing the width associated with a precoder of the second set compared to the width associated with precoders of the first set by linearly combining precoders of the first set, which are associated with different directions.

9. The method of claim 7, wherein the deriving the second set includes decreasing the width associated with a precoder of the second set compared to the width associated with a precoder of the first set by replicating an output of the precoder of the first set at different subset of the antenna ports.

10. The method of claim 1, wherein the first set of precoders covers an angular range that is also covered by the second set of precoders.

11. The method of claim 10, wherein the second set of precoders covers the angular range with an angular resolution that is different from an angular resolution with which the first set of precoders covers the angular range.

12. The method of claim 10:
wherein the angular range is partitioned into a number of portions; and
wherein the second set of precoders covers different portions of the angular range with different granularities relative to the first set of precoders.

13. The method of claim 1, wherein disjoint subsets of the precoders of the second set associate non-zero energy with different groups of the antenna ports.

14. The method of claim 1, wherein the first set of precoders and/or the second set of precoders is orthogonal.

15. The method of claim 1, wherein the first set of precoders and/or the second set of precoders is represented or representable by a corresponding precoder matrix.

16. The method of claim 1, wherein the transmit antenna includes a plurality of antenna elements and each antenna port is associated with at least one antenna element of the transmit antenna.

17. A device for transmitting reference signals (RS) from a first station using a transmit antenna with a number of antenna ports to a second station for determining channel state information (CSI) of a radio channel between the first station and the second station, the device comprising:
processing circuitry;
memory containing instructions executable by the processing circuitry whereby the device is operative to:
define a first set of precoders for the number of antenna ports;
derive, based on the first set, a second set of precoders for the number of antenna ports, wherein a second rank of the second set of precoders is different from a first rank of the first set of precoders, and the second rank of the second set is less than the number of antenna ports, and wherein each of the antenna ports is associated with non-zero energy by at least one of the precoders of the second set; and
transmit the RS using each of the precoders of the second set;
wherein each of the precoders of at least one of the first set and the second set corresponds to one or more beams, and
wherein deriving the second set from the first set includes splitting a beam corresponding to a precoder of the first set into multiple beams each corresponding to a precoder of the second set, or merging two or more beams each corresponding to a precoder of the first set into a beam corresponding to a precoder to the second set.

* * * * *